(12) United States Patent
Gunji

(10) Patent No.: US 10,678,389 B2
(45) Date of Patent: Jun. 9, 2020

(54) TOUCH SENSOR AND TOUCH DISPLAY DEVICE HAVING A PLURALITY OF TOUCH SENSOR LAYERS

(71) Applicant: Japan Display Inc., Tokyo (JP)

(72) Inventor: Masakazu Gunji, Tokyo (JP)

(73) Assignee: Japan Display Inc., Tokyo (JP)

( * ) Notice: Subject to any disclaimer, the term of this patent is extended or adjusted under 35 U.S.C. 154(b) by 58 days.

(21) Appl. No.: 15/974,078

(22) Filed: May 8, 2018

(65) Prior Publication Data

US 2018/0329537 A1    Nov. 15, 2018

(30) Foreign Application Priority Data

May 11, 2017    (JP) .................................. 2017-094667

(51) Int. Cl.
*G06F 3/044*    (2006.01)
*G06F 3/041*    (2006.01)

(52) U.S. Cl.
CPC ............ *G06F 3/044* (2013.01); *G06F 3/0412* (2013.01); *G06F 3/0418* (2013.01); *G06F 2203/04103* (2013.01); *G06F 2203/04104* (2013.01); *G06F 2203/04111* (2013.01)

(58) Field of Classification Search
CPC ....................................................... G06F 3/044
USPC .......................................................... 345/173
See application file for complete search history.

(56) References Cited

U.S. PATENT DOCUMENTS

| | | | |
|---|---|---|---|
| 2013/0207924 A1* | 8/2013 | Mohindra | G06F 3/044 345/174 |
| 2015/0009175 A1* | 1/2015 | Berget | G06F 3/044 345/174 |
| 2015/0055057 A1* | 2/2015 | Huang | G02F 1/13338 349/62 |
| 2015/0268796 A1 | 9/2015 | Tsuyuzaki et al. | |

FOREIGN PATENT DOCUMENTS

| | | |
|---|---|---|
| JP | H11-194893 A | 7/1999 |
| JP | 2015-184888 A | 10/2015 |

* cited by examiner

*Primary Examiner* — Long D Pham
(74) *Attorney, Agent, or Firm* — Michael Best & Friedrich LLP

(57) ABSTRACT

A touch sensor has a first touch electrode extending in a first direction, a second touch electrode extending in a second direction intersecting the first direction, a third touch electrode extending in a third direction intersecting between the first direction and the second direction, and a fourth touch electrode extending in a fourth direction intersecting the third direction, the first touch electrode is in the same layer as the second touch electrode.

16 Claims, 23 Drawing Sheets

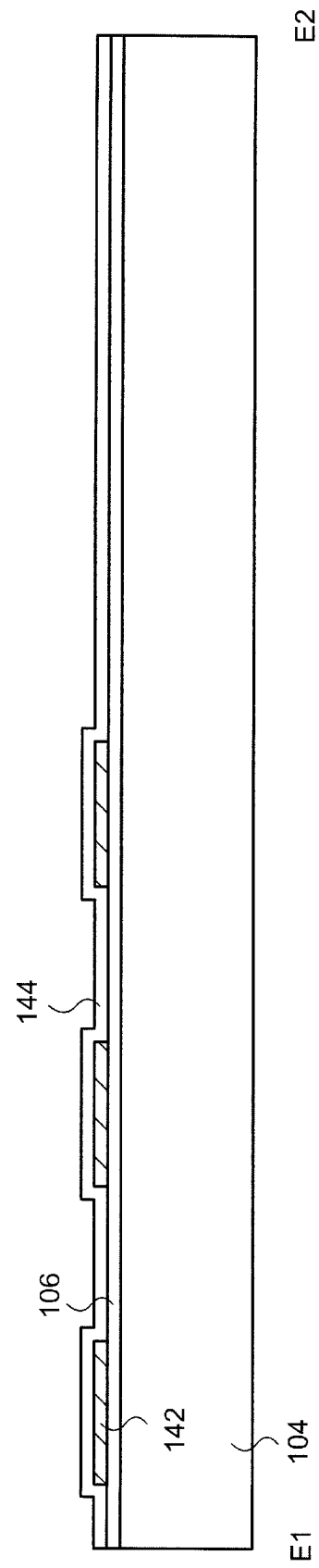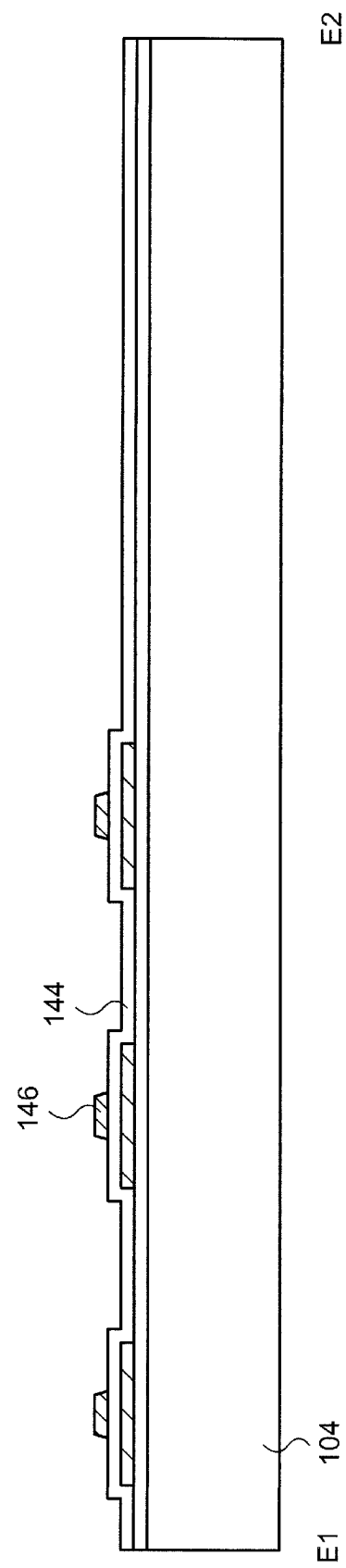

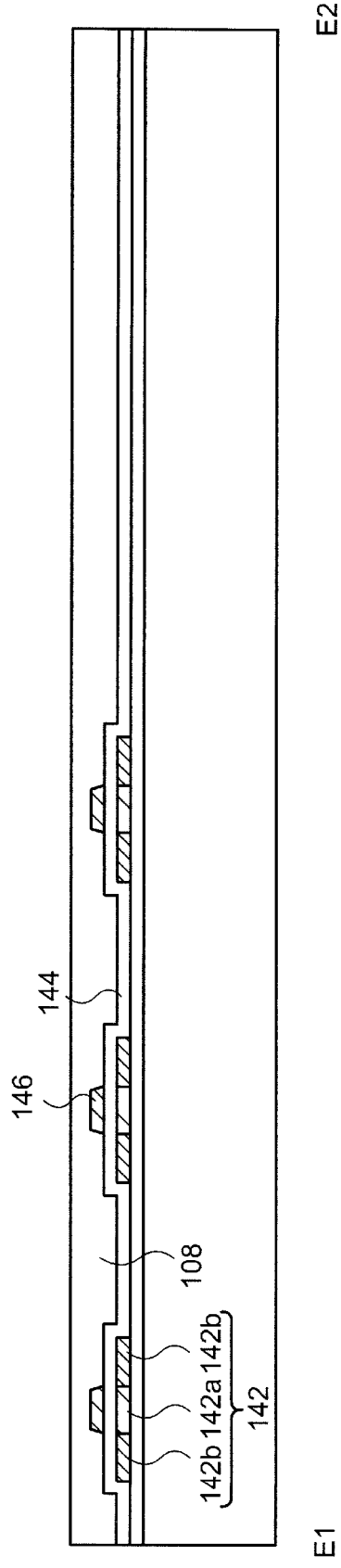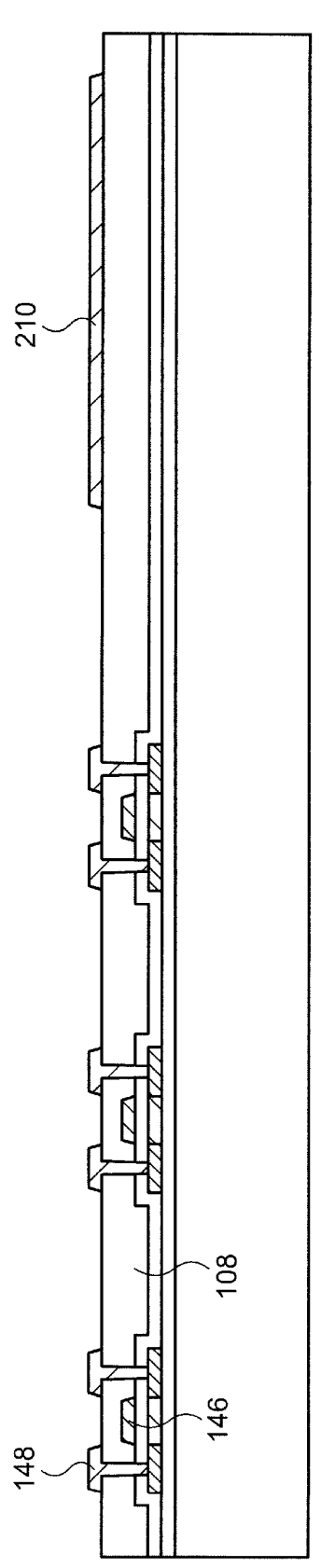

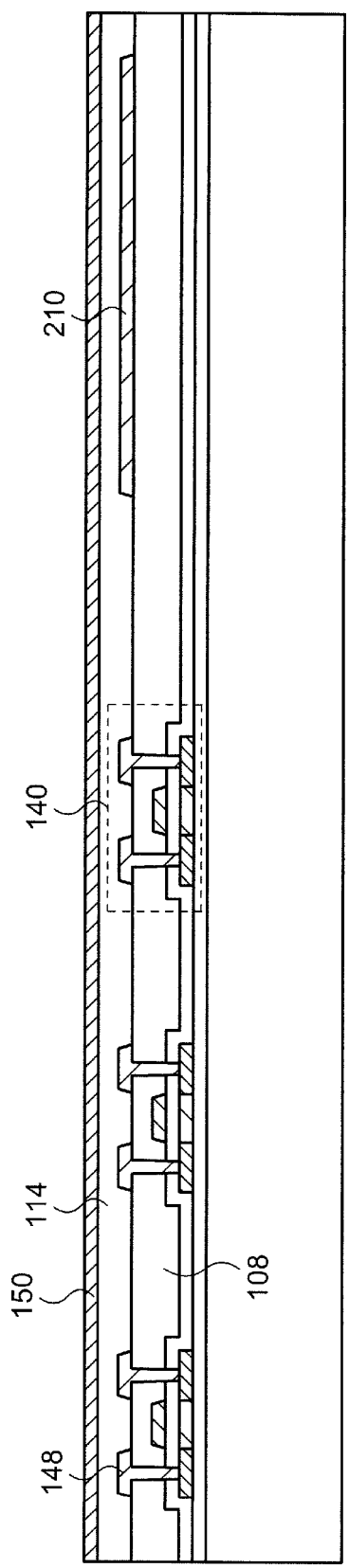
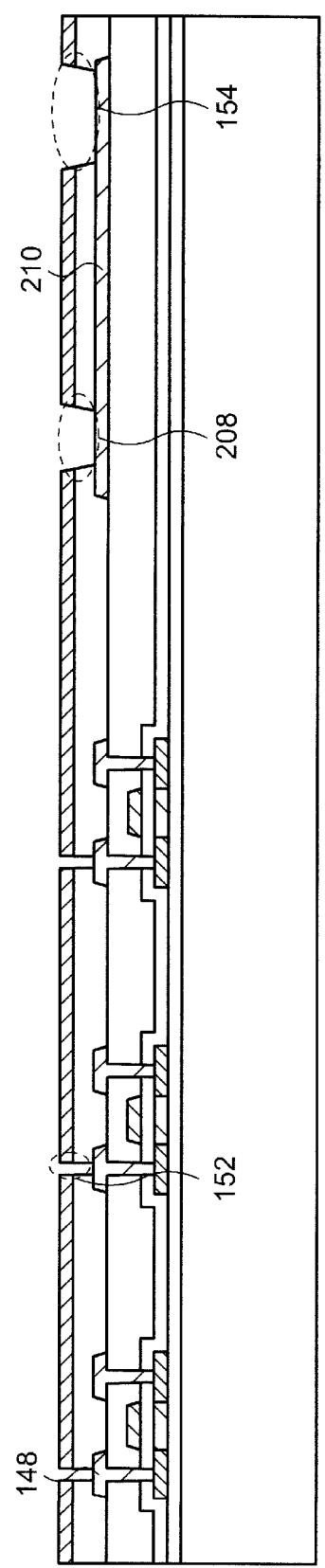
FIG. 18A
FIG. 18B

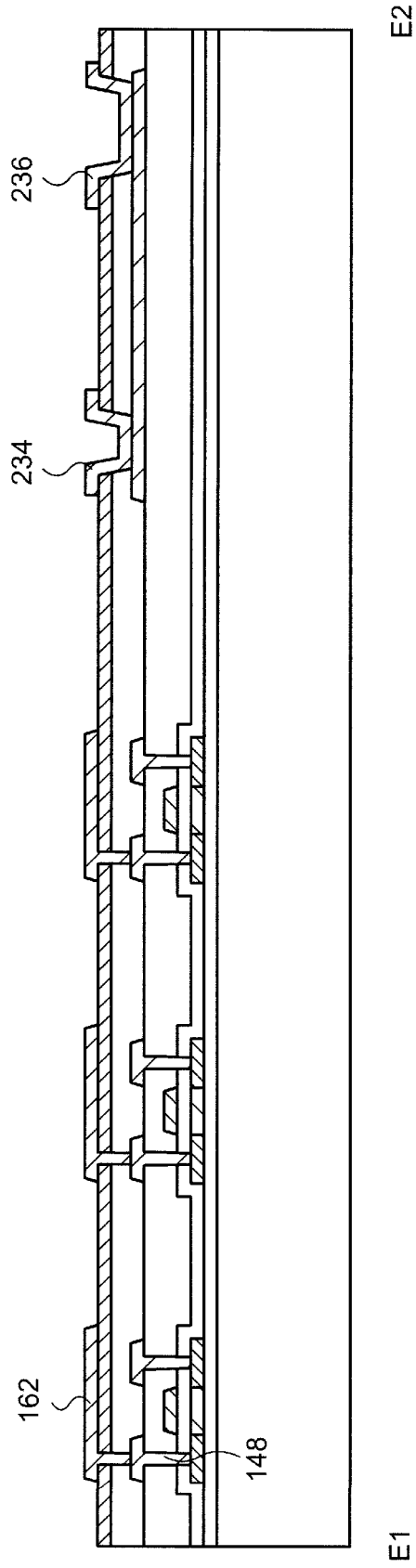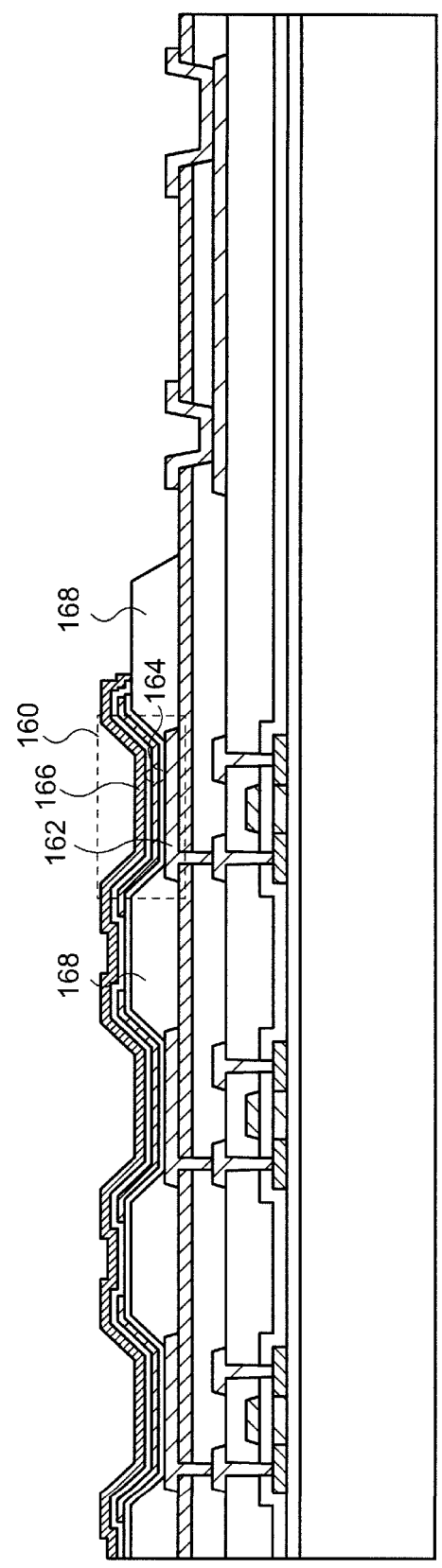

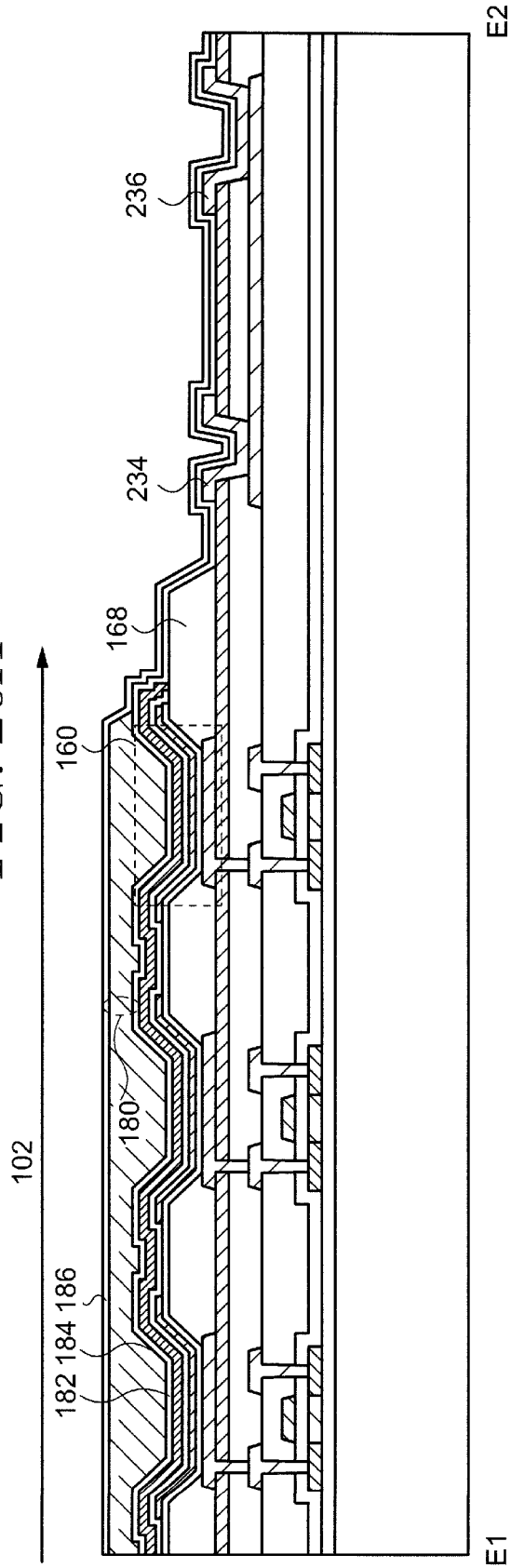
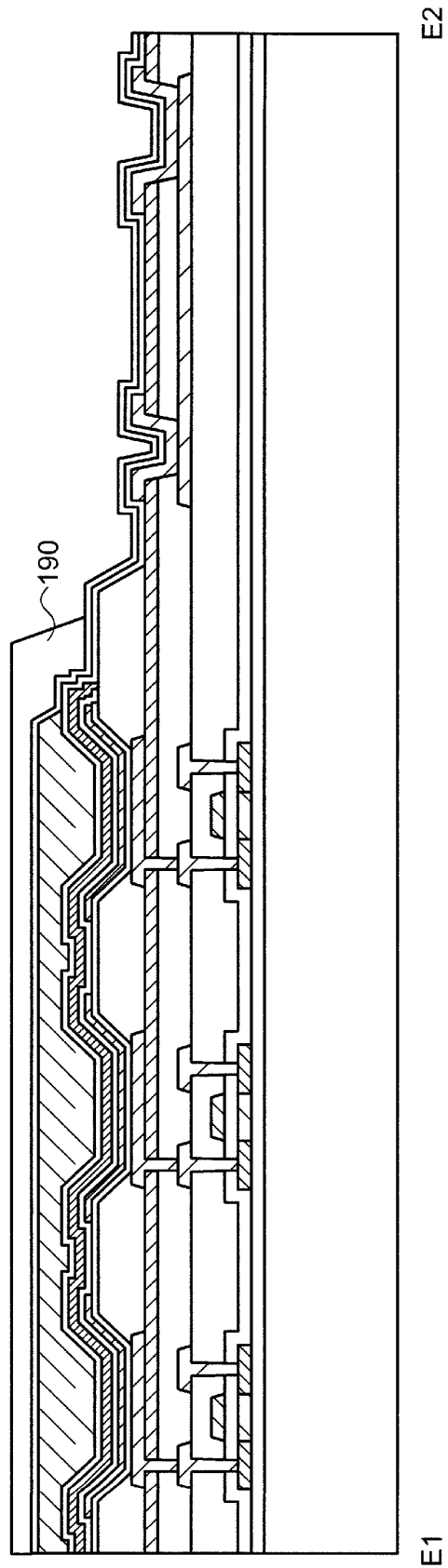

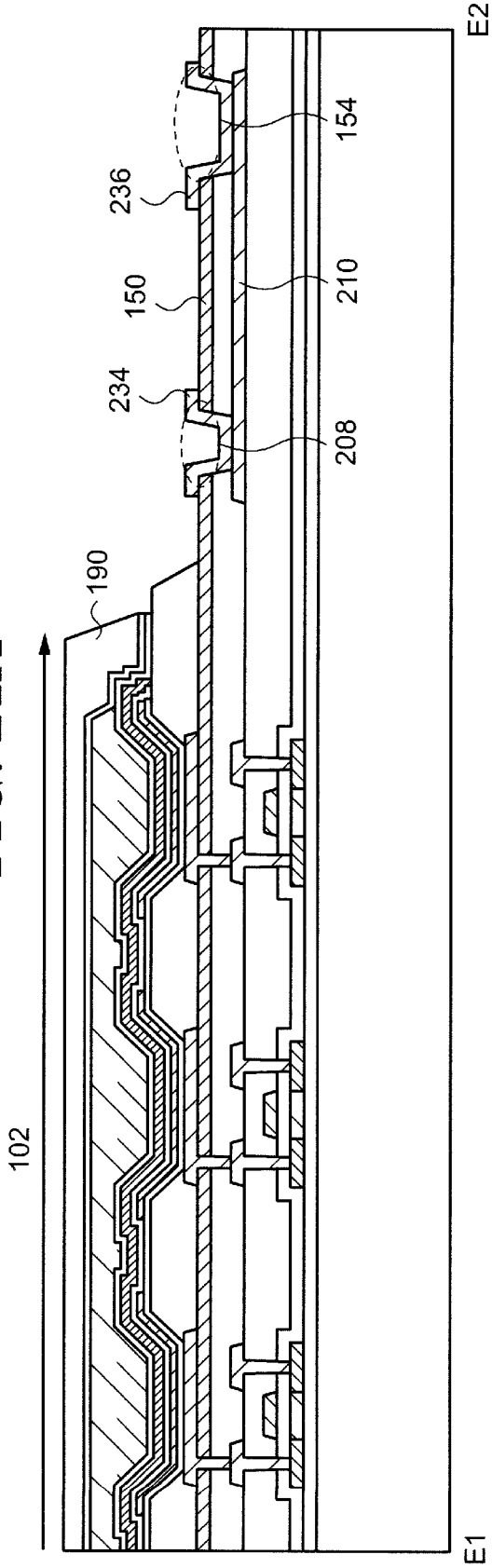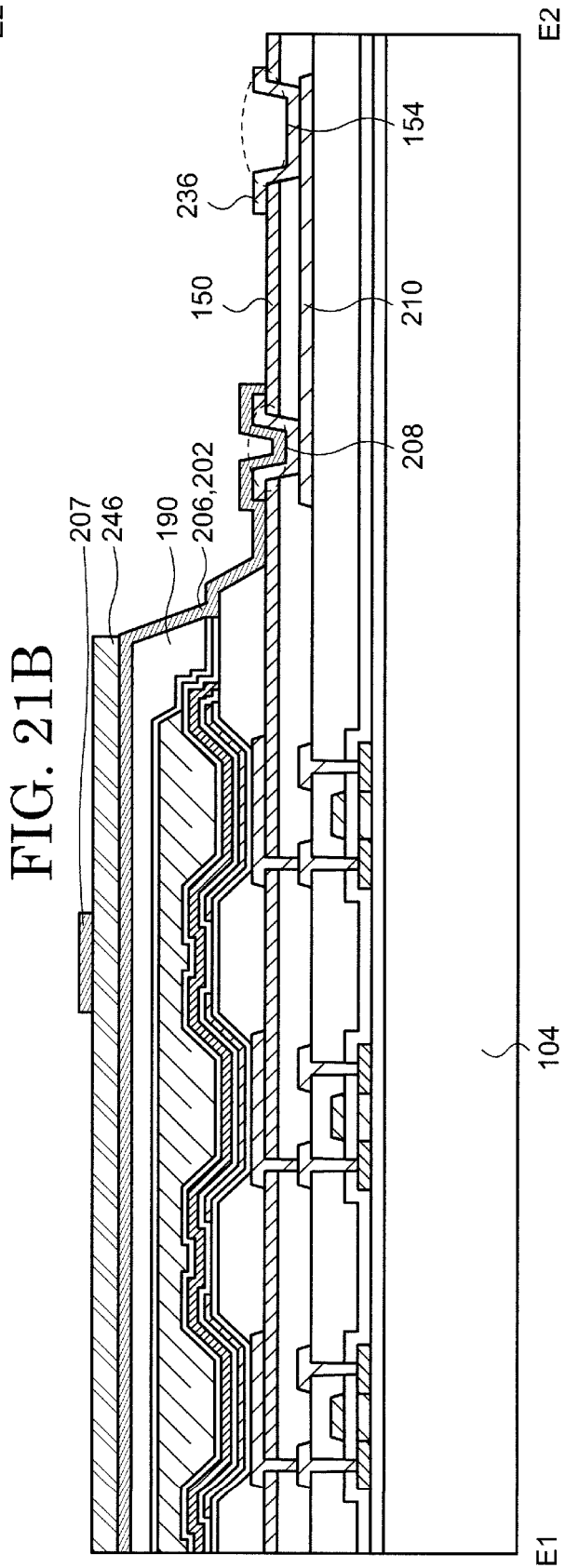

TOUCH SENSOR AND TOUCH DISPLAY DEVICE HAVING A PLURALITY OF TOUCH SENSOR LAYERS

CROSS-REFERENCE TO RELATED APPLICATIONS

This application is based upon and claims the benefit of priority from the prior Japanese Patent Application No. 2017-094667, filed on May 11, 2017, the entire contents of which are incorporated herein by reference.

FIELD

The present invention relates to a touch sensor and a display device having a touch sensor.

BACKGROUND

A touch sensor is known as an interface for users to input information into a display device. By arranging a touch sensor so as to overlap the screen of a display device, users may control input buttons, icons, and the like displayed on the screen, and may easily input information into the display device.

A display device having a touch sensor must accurately detect places which have been touched. However, there is a phenomenon called "ghost touch," in which a place other than a place that has been touched is detected. For example, in Japanese Laid-Open Patent Publication Number H11-194893, a method for detecting touched places using electrodes in two directions of columns and rows is disclosed. In Japanese Laid-Open Patent Document Number 2015-184888, a liquid crystal display device reducing the influence of ghost touch is disclosed.

SUMMARY

An embodiment of the present invention is a touch sensor having a first touch electrode extending in a first direction, a first insulating layer above the first touch electrode, a second touch electrode extending in a second direction intersecting the first direction, a third touch electrode extending in a third direction intersecting between the first direction and the second direction, and a fourth touch electrode extending in a fourth direction intersecting the third direction, the first touch electrode is in the same layer as the second touch electrode.

An embodiment of the present invention is a display device having a display region in which a plurality of pixels are arranged, and a touch sensor arranged overlapping the display region, the touch sensor has a first layer and a second layer above the first layer, the first layer includes the display region covered by a first insulating film, the second layer includes a first touch electrode extending in a first direction, a second insulating film above the first touch electrode, a second touch electrode extending in a second direction intersecting the first direction, a third touch electrode extending in a third direction intersecting between the first direction and the second direction, and a fourth touch electrode extending in a fourth direction intersecting the third direction, the first touch electrode is arranged in the same layer as the second touch electrode.

BRIEF DESCRIPTION OF THE DRAWINGS

FIG. 16A is a schematic cross-sectional view of a display device having a touch sensor according to an embodiment of the present invention;

FIG. 16B is a schematic cross-sectional view of a display device having a touch sensor according to an embodiment of the present invention;

FIG. 17A is a schematic cross-sectional view describing a manufacturing method of a display device according to an embodiment of the present invention;

FIG. 17B is a schematic cross-sectional view describing a manufacturing method of a display device according to an embodiment of the present invention;

FIG. 18A is a schematic cross-sectional view describing a manufacturing method of a display device according to an embodiment of the present invention;

FIG. 18B is a schematic cross-sectional view describing a manufacturing method of a display device according to an embodiment of the present invention;

FIG. 19A is a schematic cross-sectional view describing a manufacturing method of a display device according to an embodiment of the present invention;

FIG. 19B is a schematic cross-sectional view describing a manufacturing method of a display device according to an embodiment of the present invention;

FIG. 20A is a schematic cross-sectional view describing a manufacturing method of a display device according to an embodiment of the present invention;

FIG. 20B is a schematic cross-sectional view describing a manufacturing method of a display device according to an embodiment of the present invention;

FIG. 21A is a schematic cross-sectional view describing a manufacturing method of a display device according to an embodiment of the present invention;

FIG. 21B is a schematic cross-sectional view describing a manufacturing method of a display device according to an embodiment of the present invention.

EMBODIMENTS

Hereinafter, the embodiments of the present invention will be described while referencing the drawings. However, the present invention may be implemented in various ways, thus interpretation thereof should not be limited to the content of the embodiments exemplified below. In addition, in order to provide a clearer description, some components of the drawings such as the width, thickness, and shape of each part are represented schematically. These schematic drawings are merely examples and do not limit interpretation of the present invention. Further, in this specification and in each of the drawings, elements similar to previously described elements are marked with the same symbols (or symbols such as a, b added after numbers), and detailed descriptions are omitted accordingly. Words added to each element such as "first" and "second" are descriptive indicators used in order to differentiate between elements, and unless otherwise indicated, have no meaning other than as described above.

In the present specification, when an element or region is described as being "above" or "below" another element or region, unless otherwise indicated, not only includes situations in which an element or region is directly above or directly below another element or region, but also situations in which an element or region is above or below another element or region, that is to say, a different structural element is in between an element or region and another element or region. In the description below, unless otherwise indicated, in a cross-sectional view, the side on which a first touch sensor 200 and a second touch sensor 202 are arranged with respect to a first substrate (substrate 104) will be described as "above," and the reverse thereof will be described as "below."

The first substrate described in the present specification has at least one planar main surface, and is provided with an insulating layer, each layer of a semiconductor layer and a conductive layer, or each element such as a transistor and a display element above this main surface. In the description below, in a cross-sectional view, the main surface of the first substrate is used as a reference when describing "above," "upper layer," "upper," or "upper surface" with respect to the first substrate, unless otherwise indicated.

Embodiment 1

In the present embodiment, a structure of a display device having a touch sensor according to an embodiment of the present invention will be described.

Figure 1A:
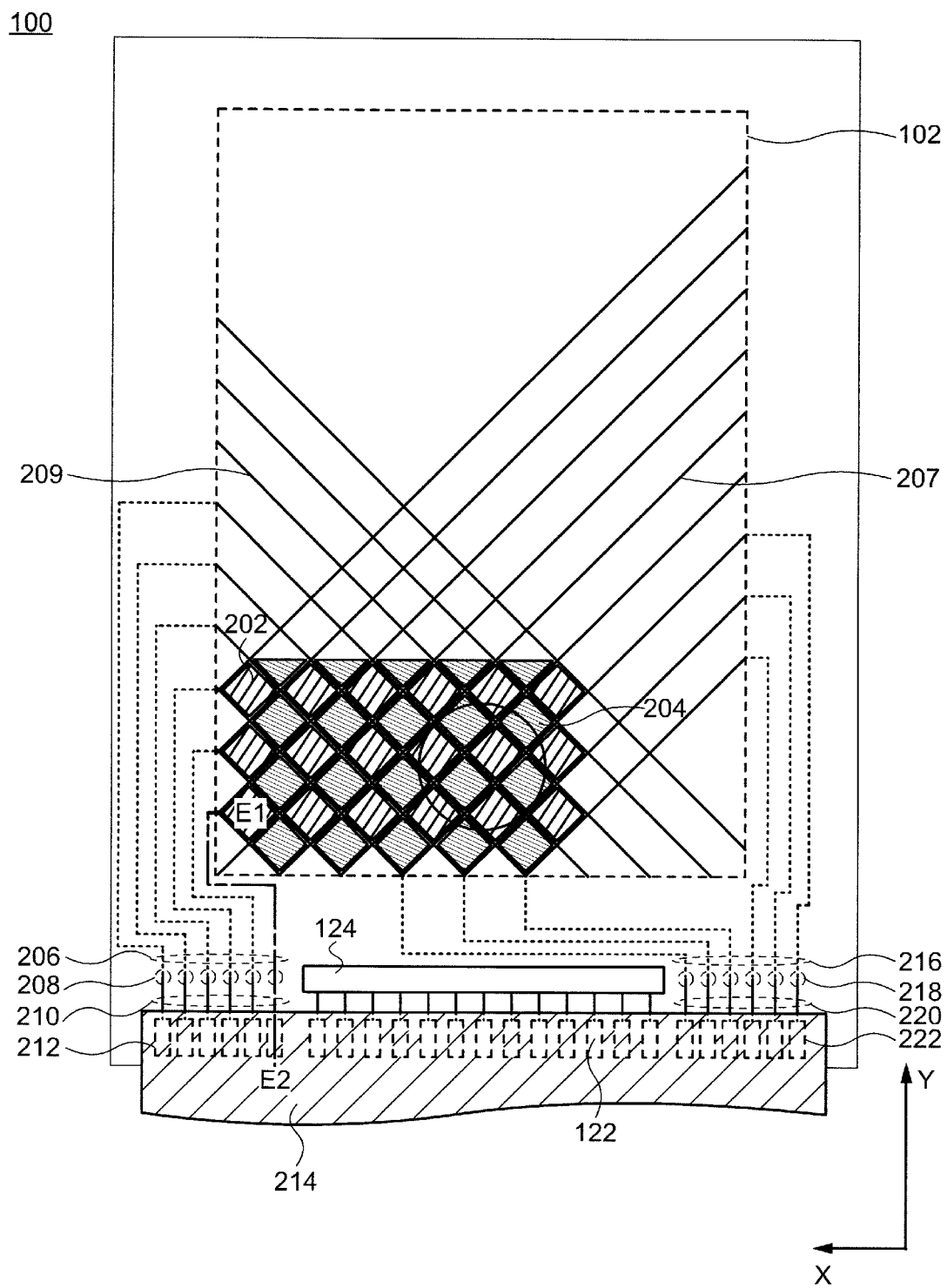
FIG. 1A is a schematic plan view of a display device having a touch sensor according to an embodiment of the present invention.
Figure 1B:
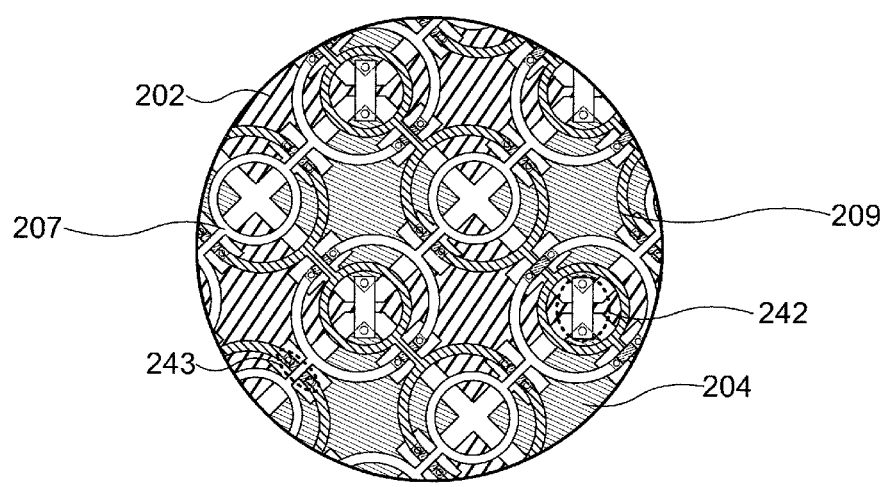
FIG. 1B is a schematic plan view of a display device having a touch sensor according to an embodiment of the present invention.

FIG. 1A is a schematic plan view of a display device 100 having a touch sensor according to an embodiment of the present invention (hereinafter written as "display device.") FIG. 1B is an enlarged plan view of the circled region shown in FIG. 1A.

The display device 100 has a display region 102 for displaying images. A plurality of first touch electrodes 202 and a plurality of second touch electrodes 204 are provided so as to overlap above the display region 102. The plurality of first touch electrodes 202 extend in a first direction X and are arranged in a second direction Y intersecting the first direction X. The plurality of second touch electrodes 204 extend in the second direction Y and are arranged in the first direction X. Further, a plurality of third touch electrodes 207 and a plurality of fourth touch electrodes 209 are provided so as to overlap above the display region 102. The third touch electrodes 207 extend in a third direction intersecting between the first direction X and the second direction Y and are arranged in a fourth direction intersecting the third direction. The plurality of fourth touch electrodes 209 extend in the fourth direction and are arranged in the third direction. The plurality of first touch electrodes 202 and the plurality of second touch electrodes 204 are arranged in the same layer. Additionally, the plurality of third touch electrodes 207 and the plurality of fourth touch electrodes 209 are arranged in the same layer. A so-called projection-type capacitance first touch sensor 200 is configured by the plurality first touch electrodes 202 and the plurality of second touch electrodes 204. In addition, a projection-type capacitance second touch sensor 201 is configured by the plurality of third touch electrodes 207 and the plurality of fourth touch electrodes 209. Projection-type capacitance touch sensors fall into the categories of self-capacitance types and mutual capacitance types. In an embodiment according to the present invention, a self-capacitance type touch sensor is used.

In a self-capacitance type, by a detection target such as a person's finger touching or coming in contact with (hereinafter, touching and coming in contact will be collectively referred to as "touch") the display region 102 via the first touch electrode 202 and the second touch electrode 204, capacitance is generated between the detection target and the first touch electrode 202 or the second touch electrode 204, in addition to parasitic capacitance in the first touch electrode 202 or the second touch electrode 204. The first touch sensor 200 may detect touched places by reading this change. This is the same in the second touch sensor 201 configured by the third touch electrode 207 and the fourth touch electrode 209.

With a structure such as the one above, ghost touch may be discerned from one or more places touched by a user. For example, the first touch sensor 200 may detect one or more places touched by the user and the second touch sensor 201 may detect ghost touch, thus discerning places affected by ghost touch. In addition, the second touch sensor 201 may detect one or more places touched by the user and the first touch sensor 200 may detect ghost touch, thus discerning places affected by ghost touch.

The first touch electrode 202 and the fourth touch electrode 209 are electrically connected to a first wiring 206 extending from outside of the display region 102. The first wiring 206 extends outside of the display region 102 and is electrically connected to a first terminal wiring 210 via a contact hole 208. The first terminal wiring 210 is exposed near the edge portion of the display device 100 and forms a first terminal 212. The first terminal 212 is connected to a connector 214 such as a flexible printed circuit substrate (FPC). Signals for the touch sensors are supplied from an exterior circuit (not illustrated) to the first touch electrode 202 and the fourth touch electrode 209 via the first terminal 212.

Similarly, the second touch electrode 204 and the third touch electrode 207 are electrically connected to a second wiring 216 extending from outside of the display region 102. The second wiring 216 extends outside of the display region 102 and is electrically connected to a second terminal wiring 220 via a contact hole 218. The second terminal wiring 220 is exposed near the edge portion of the display device 100 and forms a second terminal 222. The second terminal 222 is connected to the connector 214. Signals for touch sensors are supplied from an external circuit to the second touch electrode 204 and the third touch electrode 207 via the second terminal 222.

FIG. 1A further shows a third terminal 122 and a signal line drive circuit 124. Signals supplied to a pixel 120 in the display region 102 are sent to the third terminal 122 from an external circuit. Additionally, the signal line drive circuit 124 controls the drive of the pixel 120. As is shown in FIG. 1A, the first terminal 212, the second terminal 222, and the third terminal 122 may be formed in a line on one side of the display device 100. Thus, signals may be supplied to the display region 102 and the first touch sensor 200 using a single connector 214.

Figure 2:
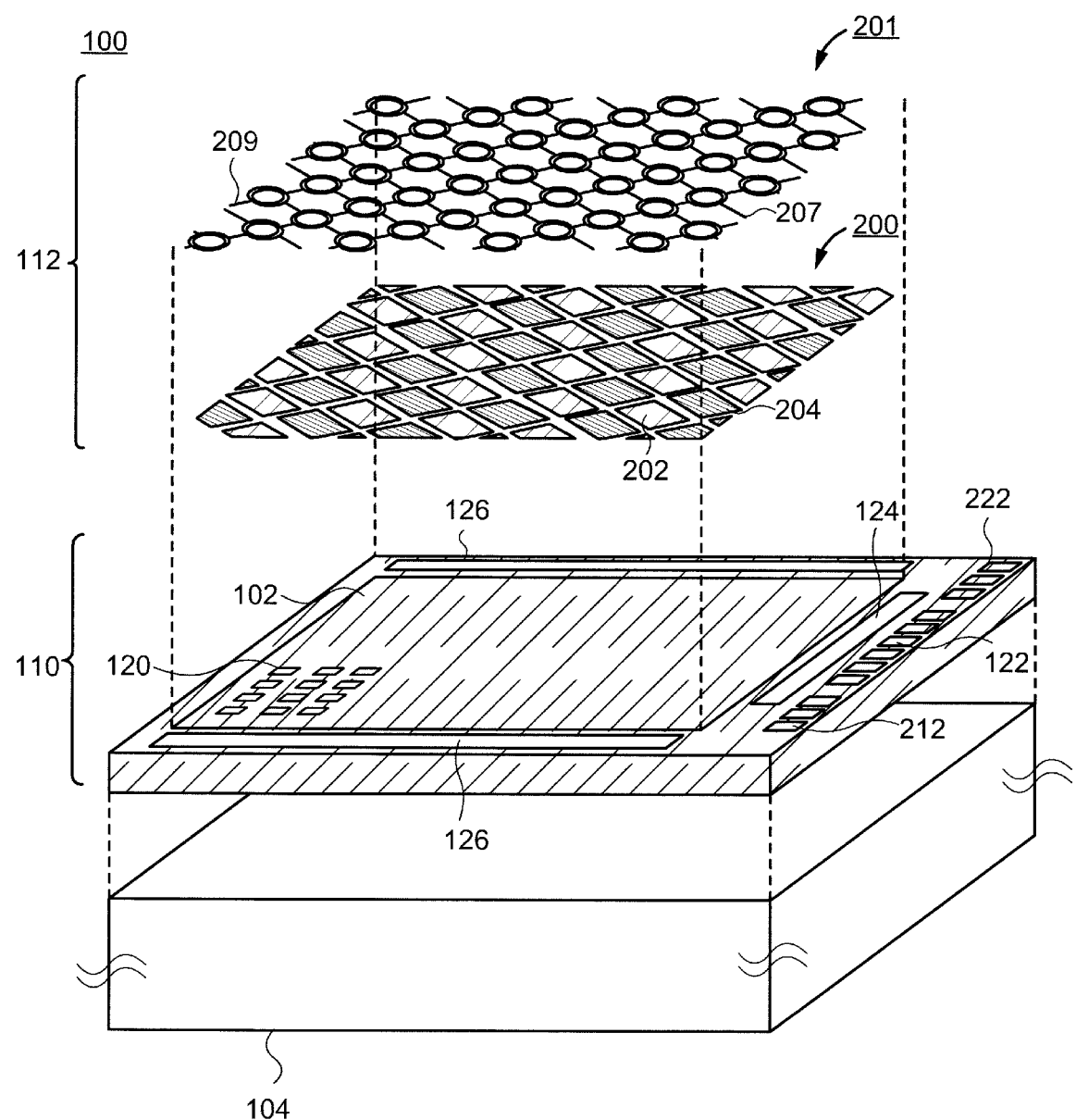
FIG. 2 is a schematic perspective view of a display device having a touch sensor according to an embodiment of the present invention.

FIG. 2 shows a schematic perspective view of the display device 100. Here, for facilitating understanding, a first layer 110 including the substrate 104 and the display region 102, the first touch sensor 200, and a second layer 112 including the second touch sensor 201 are shown separated from each other. Further, hereinafter, in the touch sensor, the surface of the side on which the first layer 110 and the second layer 112 are arranged with respect to the substrate 104 will be referred to as "surface," and the reverse thereof will be referred to as "rear surface."

The first layer 110 is provided above the substrate 104. The first layer 110 includes the previously described display region 102. A plurality of pixels 120 are provided in the display region 102. A scanning line drive circuit 126 and a signal line drive circuit 124 for controlling the drive of the pixel 120 are provided outside of the display region 102. Here, an example is shown in which the scanning line drive circuit 126 and the signal line drive circuit 124 are formed directly above the substrate 104, however, it is not limited to this example. For example, a drive circuit may be formed above a substrate (a semiconductor substrate or the like) different from the substrate 104. The substrate on which the drive circuit is formed may be provided above the substrate 104 and the connector 214. Further, each pixel 120 may be controlled by these drive circuits. Additionally, a portion of the scanning line drive circuit 126 and the signal line drive circuit 124 may be formed above the substrate different from the substrate 104, and be configured above the substrate 104 and the connector 214. Further, although not illustrated here, a variety of semiconductor elements for controlling display elements such as light emitting elements or liquid crystal elements provided within the pixel 120 are formed in the first layer 110.

Further, as described above, the first touch sensor 200 is formed by a plurality of first touch electrodes 202 and a plurality of second touch electrodes 204. In addition, the second touch sensor 201 is formed by a plurality of third touch electrodes 207 and a plurality of fourth touch electrodes 209. The first touch sensor 200 and the second touch sensor 201 may have a touch detection region of approximately the same size and approximately the same shape as the display region 102.

Figure 3A:
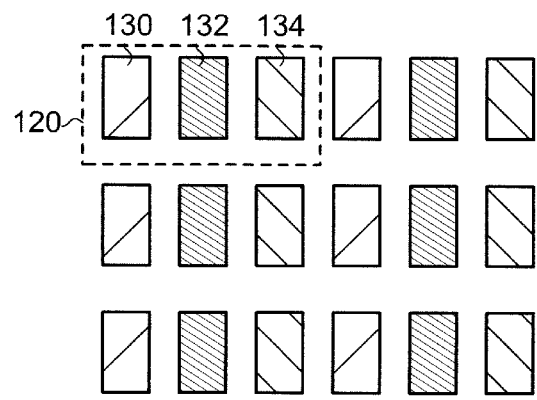
FIG. 3A is a schematic diagram of a pixel of a display device having a touch sensor according to an embodiment of the present invention.
Figure 3B:
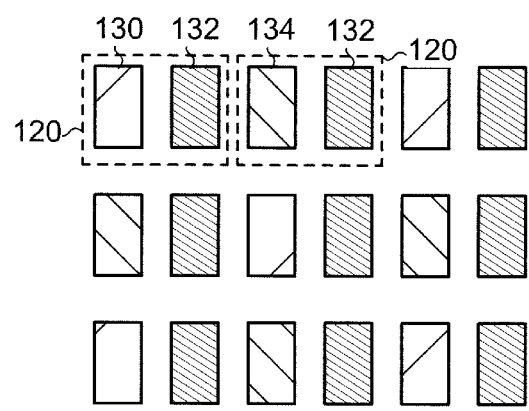
FIG. 3B is a schematic diagram of a pixel of a display device having a touch sensor according to an embodiment of the present invention.
Figure 3C:
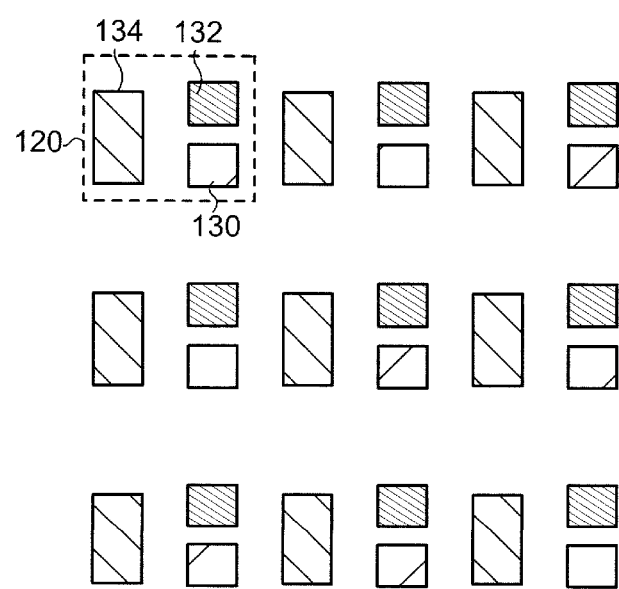
FIG. 3C is a schematic diagram of a pixel of a display device having a touch sensor according to an embodiment of the present invention.

FIG. 3A, FIG. 3B, and FIG. 3C show a schematic layout of a pixel according to an embodiment of the present invention. The pixel 120 has a plurality of subpixels. The subpixels are arranged as is shown in FIG. 3A, for example, in which a subpixel 130, a subpixel 132, and a subpixel 134 are formed in one pixel 120. One display element such as a light emitting element or a liquid crystal element is provided in each subpixel. The colorization of the subpixels is determined by the characteristics of a color filter provided above the light emitting element or the subpixel. In this specification and the claims, the smallest possible structure of the pixel 120 is one in which each pixel has one display element and a plurality of subpixels having at least one different color, configuring a portion of an image displayed in the display region 102. The subpixels in the display region 102 are included in any of the pixels 120.

In the arrangement illustrated in FIG. 3A, the subpixel 130, the subpixel 132, and the subpixel 134 may be configured so as to produce different colors from each other. For example, the subpixel 130, the subpixel 132, and the subpixel 134 may be provided with a light emitting element emitting three colors of red, green, and blue, respectively. Therefore, by supplying a 256 degree voltage or current to each of the three subpixels, a full color display device may be provided.

In the arrangement shown in FIG. 3B, two subpixels producing different colors are included in one pixel 120. For example, one pixel 120 may be provided with the subpixel 130 producing red and the subpixel 132 producing green, and an adjacent pixel 120 may be provided with the subpixel 134 producing blue and the subpixel 132 producing green. In this case, the replicated color gamut varies between adjacent pixels 120.

The surface areas of the subpixels in each pixel 120 do not have to be the same. For example, as is shown in FIG. 3C, one subpixel may have a different surface area than the other two subpixels. In this case, for example, the subpixel 134 producing blue may be formed with the largest surface area, and the subpixel 132 producing green and the subpixel 130 producing red may be formed so as to have the same surface areas.

Figure 4:
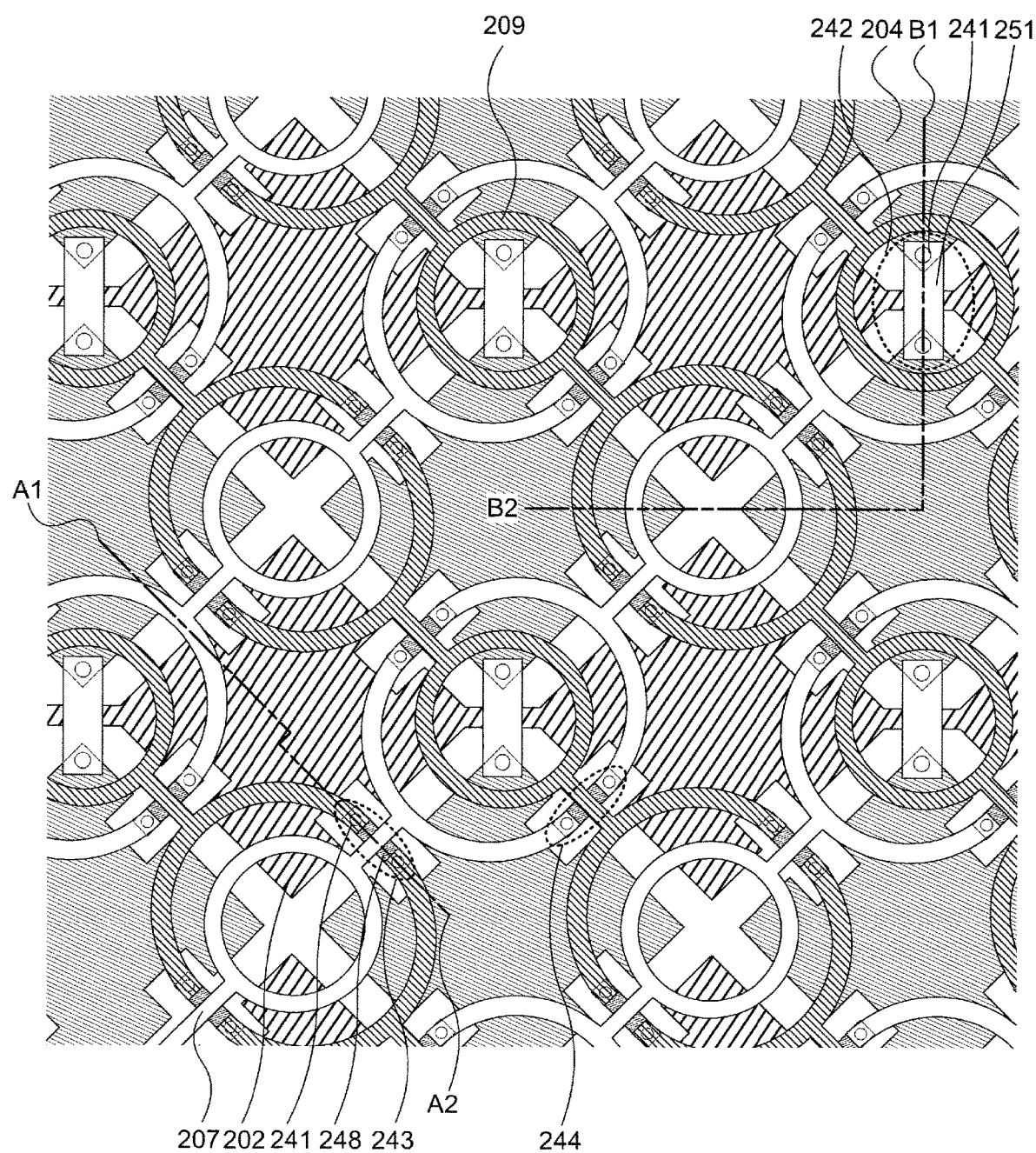
FIG. 4 is a schematic plan view of a touch sensor according to an embodiment of the present invention.

FIG. 4 shows an example in which a portion of the area of the touch sensor shown in FIG. 1 is expanded. As is shown in FIG. 4, the first touch electrode 202 and the second touch electrode 204 each have a plurality of rectangular regions (diamond electrodes) having an approximately rectangular shape and a plurality of first connection regions 242. Further, the first touch electrode 202 and the second electrode 204 are arranged so as to intersect with each other. The first touch electrode 202 and the second touch electrode 204 intersect in the first connection region 242. The approximately rectangular shape, for example as is shown in FIG. 4, is a shape in which a U-shaped notch is provided on each side. The first touch electrode 202 and the second touch electrode 204 are separated from each other and are electrically independent. The third touch electrode 207 and the fourth touch electrode 209 each have a plurality of regions in which linear shaped, circular shaped, and arc-like shaped portions are arbitrarily electrically connected, and a plurality of second connection regions 243 or a plurality of third connection regions 244. Further, the third touch electrode 207 and the fourth touch electrode 209 are arranged so as to alternate with each other. The third touch electrode 207 and the fourth touch electrode 209 intersect each other in the second connection region 243 and the third connection region 244. The third touch electrode 207 and fourth touch electrode 209 are separated from each other and are electrically independent.

Figure 5A:
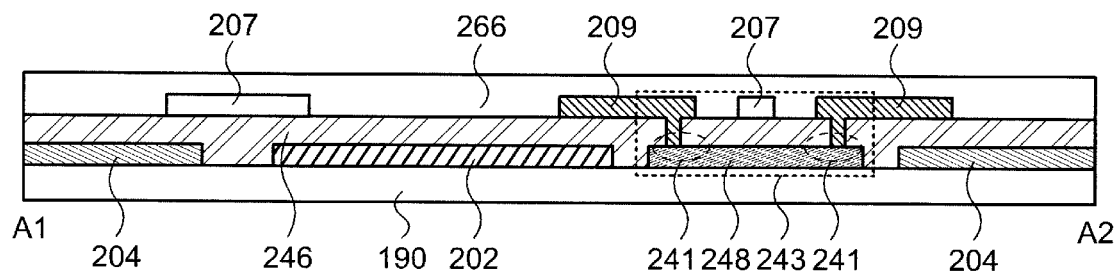
FIG. 5A is a schematic cross-sectional view of a touch sensor according to an embodiment of the present invention.

A cross-section taken along line A1-A2 in FIG. 4 is shown in FIG. 5A. A cross-section taken along line B1-B2 in FIG. 4 is shown in FIG. 5B.

As is shown in FIG. 5A, the third touch electrode 207 and the fourth touch electrode 209 are arranged in the same layer, the first touch electrode 202, the second touch electrode 204, and a first bridge wiring 248 are arranged in the same layer, and an interlayer insulating film 246 is formed therebetween. The first bridge wiring 248 is electrically connected to two adjacent arc-like fourth touch electrodes 209 in an opening 241 provided in the interlayer insulating film 246. Accordingly, the first bridge wiring 248 may be recognized as the second connection region 243 of the fourth touch electrode 209. In the present embodiment, a cross-section of the third connection region 244 is omitted. In the third connection region 244, the first bridge wiring 248 is electrically connected to two adjacent arc-like third touch electrodes 207 via the opening 241 provided in the interlayer insulating film 246. With a structure such as this, the interlayer insulating film 246 electrically insulates the third touch electrode 207 and the fourth electrode 209, and the first touch electrode 202 and the second touch electrode 204, and functions as a dielectric for forming capacitance between each of the third touch electrodes 207, the fourth touch electrodes 209, the first touch electrodes 202, and the second touch electrodes 204.

Figure 5B:
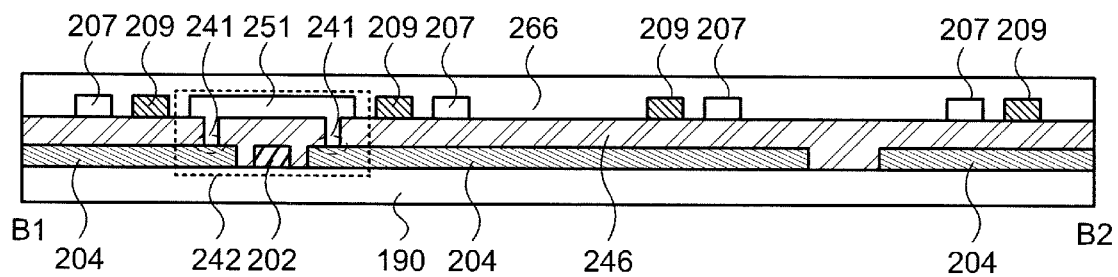
FIG. 5B is a schematic cross-sectional view of a touch sensor according to an embodiment of the present invention.

As is shown in FIG. 5B, the third touch electrode 207, the fourth touch electrode 209, and a second bridge wiring 251 are arranged in the same layer, the first touch electrode 202 and the second touch electrode 204 are arranged in the same layer, and the interlayer insulating film 246 is provided therebetween. The second bridge wiring 251 is electrically connected to two adjacent diamond second touch electrodes 204 in the opening 241 provided inside the interlayer insulating film 246. Therefore, the second bridge wiring 251 may also be recognized as the first connection region 242 of the second touch electrode 204. In FIG. 5B, an example is shown in which the second bridge wiring 251 is electrically connected to two adjacent diamond second touch electrodes 204, however, it is not limited to this example. The second bridge wiring 251 may also electrically connect two adjacent diamond first touch electrodes 202.

Further, the second bridge wiring 251 is arranged between a notched portion in the rectangular region of the first touch electrode 202 and a notched portion in the rectangular region of the second touch electrode 204. In the touch sensor according to an embodiment of the present invention, with a structure and arrangement such as this, the capacitance value and resistance value of the third touch electrode and the fourth touch electrode may be made generally uniform.

The third touch electrode 207 and the fourth touch electrode 209 are arranged such that the region in which the arc-like linear shaped fourth touch electrode and the third connection region 244 are electrically connected surrounds the region in which the linear shaped and circular shaped third touch electrodes are electrically connected (arrangement A). The region in which the arc-like linear shaped third touch electrode and the second connection region 243 are electrically connected is arranged so as to surround the region in which the linear shaped and circular shaped fourth touch electrodes are electrically connected (arrangement B). Arrangement A and arrangement B are arranged alternating with each other. The first connection region 242 is arranged on the inner side of the circular fourth touch electrode of arrangement B.

With a shape and arrangement such as this, the third touch electrode 207 and the fourth touch electrode 209 may have approximately similar capacitance values and resistance values. That is to say, since the capacitance value and resistance value of each touch electrode may be generally uniform in an untouched state (initial state), small changes in capacitance values and resistance values after touch may be detected, and the accuracy of detection and recognition of ghost touch may be improved.

Figure 6A:
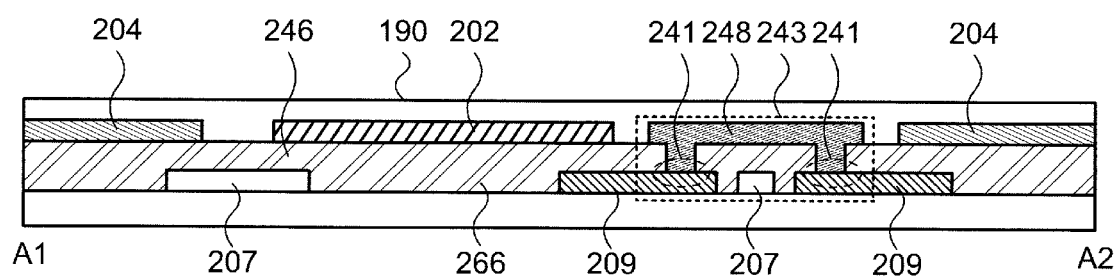
FIG. 6A is a schematic cross-sectional view of a touch sensor according to an embodiment of the present invention.
Figure 6B:
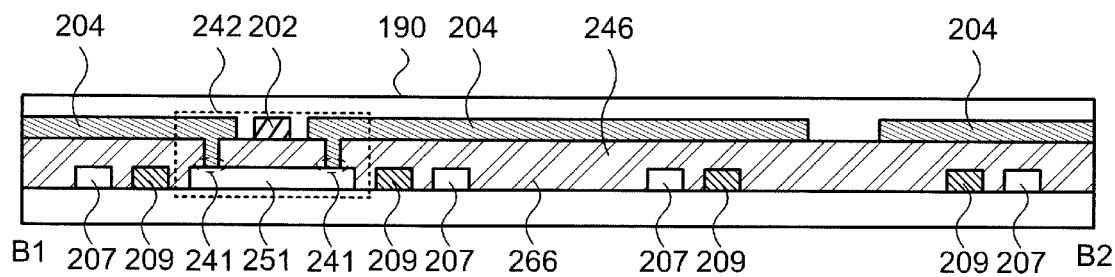
FIG. 6B is a schematic cross-sectional view of a touch sensor according to an embodiment of the present invention.

FIGS. 6A and 6B show a structure in which the layer containing the third touch electrode 207, the fourth touch electrode 209, and the second bridge wiring 251 is switched with the layer containing the first touch electrode 202, the second touch electrode 204, and the first bridge wiring 248. The interlayer insulating film 246 is provided therebetween. In this way, even when the upper and lower layers are switched, the capacitance value and the resistance value of each touch electrode may be generally uniform in an untouched state (initial state). Thus, even if the capacitance value and the resistance value after touch are small, these changes may be detected, and the accuracy of detection and recognition of ghost touch may be improved.

An example is shown in which the first touch electrode 202, the second touch electrode 204, the third touch electrode, and the fourth touch electrode are provided so as to overlap the display region 102 as is shown in FIG. 2, thus including an oxide through which visible light may pass. For example, this oxide may be indium tin oxide (ITO) or indium zinc oxide (IZO). However, when the first touch electrode 202, the second touch electrode 204, the third touch electrode, and the fourth touch electrode are formed so as to only overlap the gap portions of each pixel 120, an opaque metal material may be used.

In an embodiment of the present invention, since the third touch electrode 207, the fourth touch electrode 209, and the second bridge wiring 251 may be arranged in the same layer, and the first touch electrode 202, the second touch electrode 204, and the first bridge wiring 248 may be arranged in the same layer, a touch sensor may be formed without increasing the number of layers in a conventional touch sensor. That is to say, without changing the thickness, a touch sensor may be provided in which the detection and recognition of ghost touch may be improved compared to that of a conventional touch sensor.

Further, an example of a touch sensor according to an embodiment of the present invention is shown in which the third touch electrode 207, the fourth touch electrode 209, and the second bridge wiring 251 are arranged in the same layer, and in which the first touch electrode 202, the second touch electrode 204, and the first bridge wiring 248 are arranged in the same layer, however, the touch sensor is not limited to this arrangement. The first through fourth touch electrodes may each be arranged in different layers. In this case, an interlayer insulating film similar to the interlayer insulating film 246 may be arranged between each layer. In this way, since the degree of freedom of the shape and arrangement of the touch sensor may be increased, the capacitance value and the resistance value of the touch electrodes may be made further uniform. Therefore, detection and recognition of ghost touch may become more accurate. Since it is not necessary to form the opening 241, the process may be simplified, and the throughput of manufacturing the touch sensor may be improved.

Embodiment 2

In the present embodiment, another structure of a touch sensor according to an embodiment of the present invention will be described. Further, descriptions of structures similar to those of Embodiment 1 will be omitted.

Figure 7:
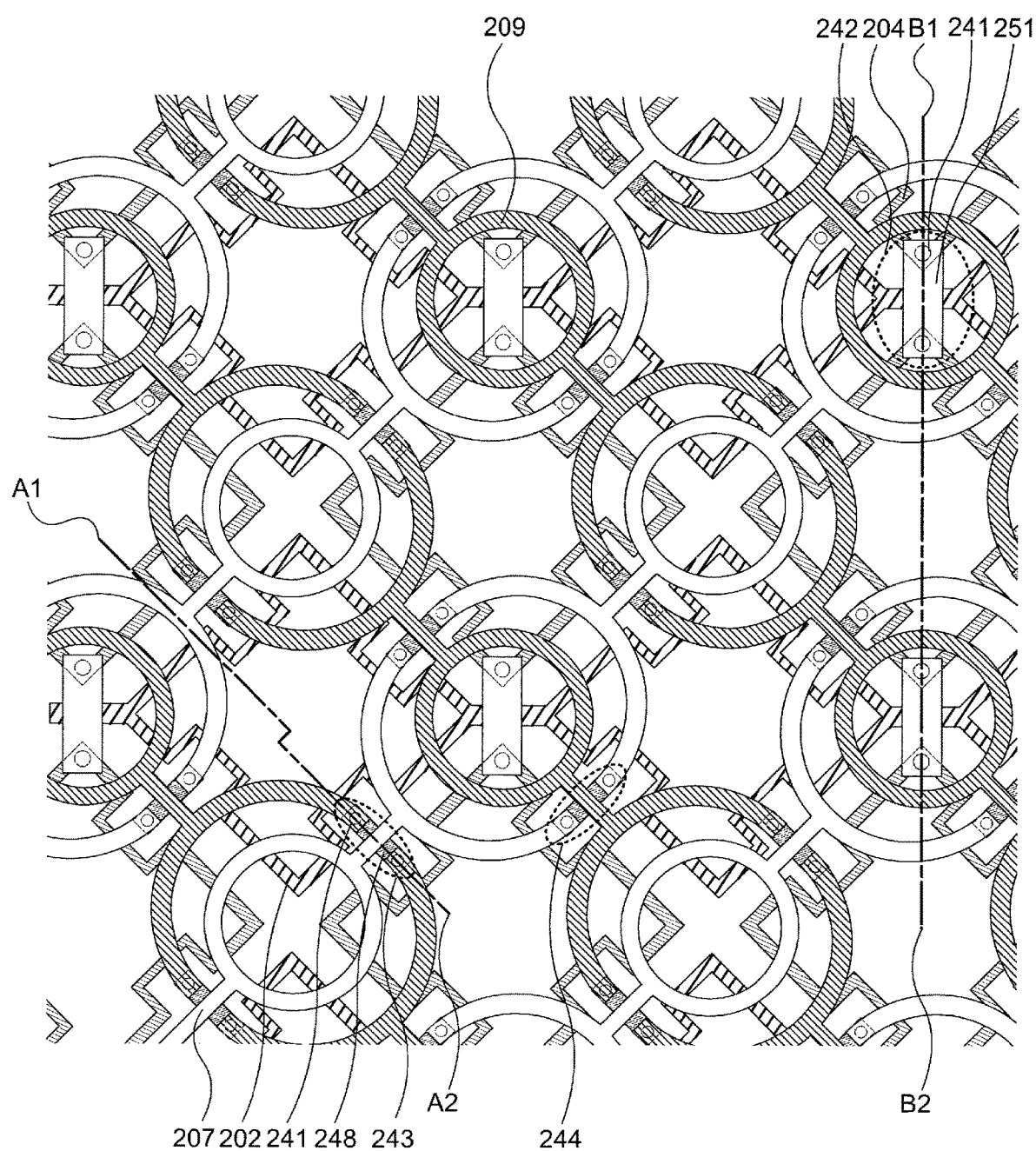
FIG. 7 is a schematic plan view of a touch sensor according to an embodiment of the present invention.
Figure 8A:
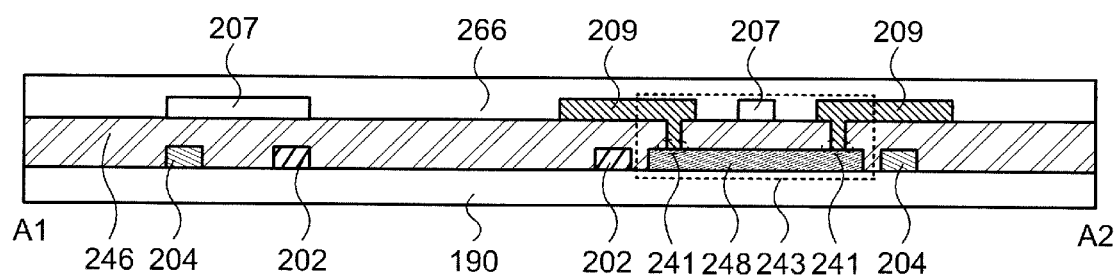
FIG. 8A is a schematic cross-sectional view of a touch sensor according to an embodiment of the present invention.
Figure 8B:
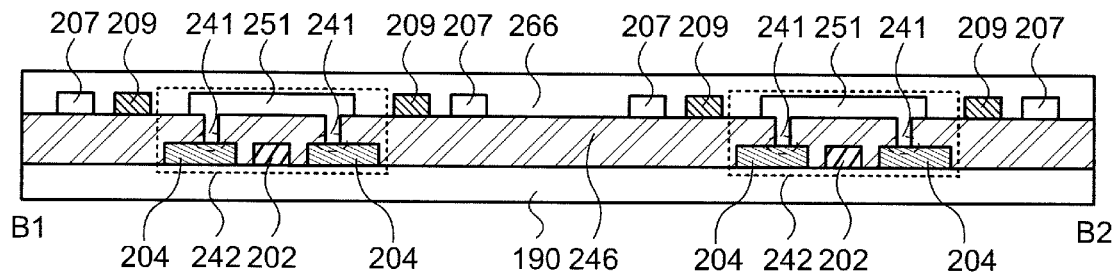
FIG. 8B is a schematic cross-sectional view of a touch sensor according to an embodiment of the present invention.

FIG. 7 is a schematic plan view showing an example of a touch sensor according to an embodiment of the present invention. FIG. 8A is a schematic cross-sectional view taken along line A1-A2 in FIG. 7. FIG. 8B is a schematic cross-sectional view taken along line B1-B2 in FIG. 7. FIG. 7 shows an example in which the plurality of rectangular regions (diamond electrodes) having a rectangular shape described in FIG. 4 have a shape in which the edge of the rectangular shape remains. Structures other than this are similar to those of FIG. 4, thus, a description is omitted.

Since the first touch electrode 202, the second touch electrode 204, the third touch electrode, and the fourth touch electrode shown in FIG. 7 are provided so as to overlap the display region 102 as is shown in FIG. 2, an example is shown including an oxide material through which visible light may pass, however, it is not limited to this example. Since each electrode shown in FIG. 7 is formed of thin wires, the size of the surface area on which the touch electrodes are arranged may be reduced. In addition, each may be formed of a metal material or the like. In this case, silver and aluminum are used as metal materials, and the transmittance for example, is below 1%.

In a display device having a touch sensor such as this, the size of the surface area on which the touch electrodes are arranged may be reduced, and the resistance value of the touch electrodes may be the same as that of a conventional touch sensor using transparent electrodes. Therefore, not only does detection and recognition of ghost touch become easier as in Embodiment 1, sufficient sensor accuracy is maintained, the touch electrodes are less visible to the user, and the transmissivity rate of the display device may become greater.

Figure 9:
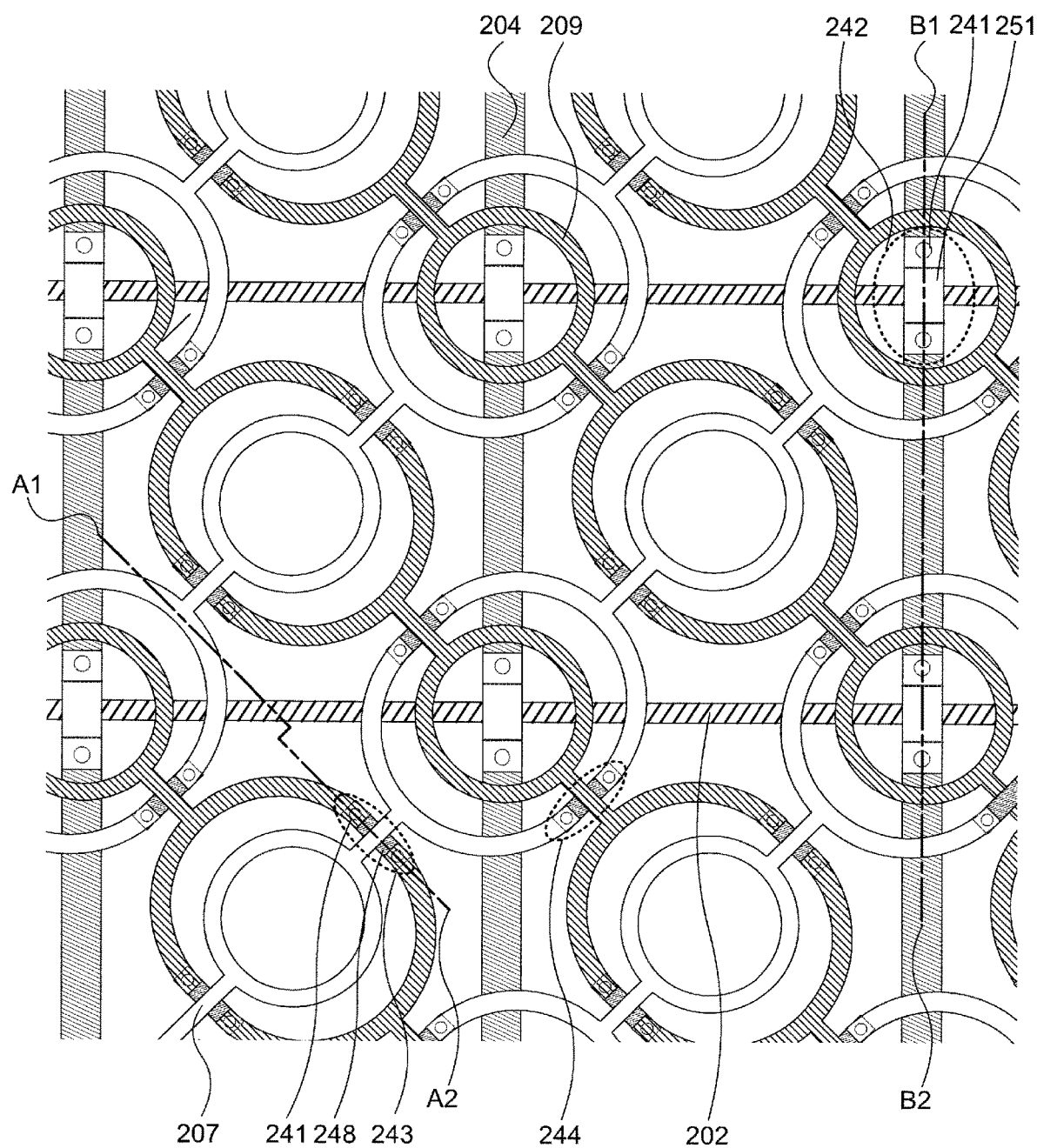
FIG. 9 is a schematic plan view of a touch sensor according to an embodiment of the present invention.
Figure 10A:
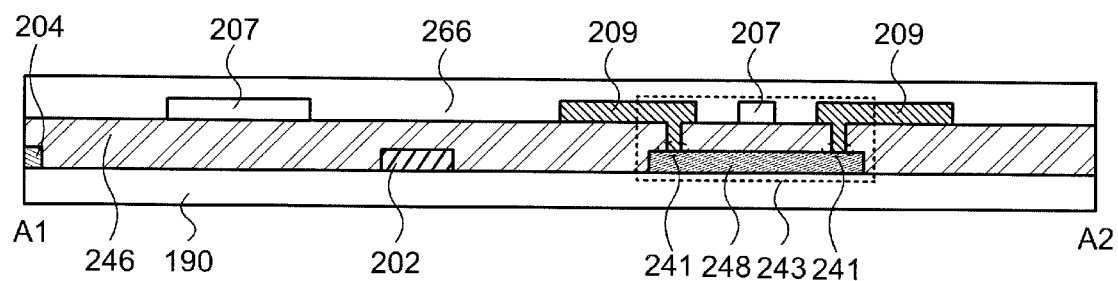
FIG. 10A is a schematic cross-sectional view of a touch sensor according to an embodiment of the present invention.
Figure 10B:
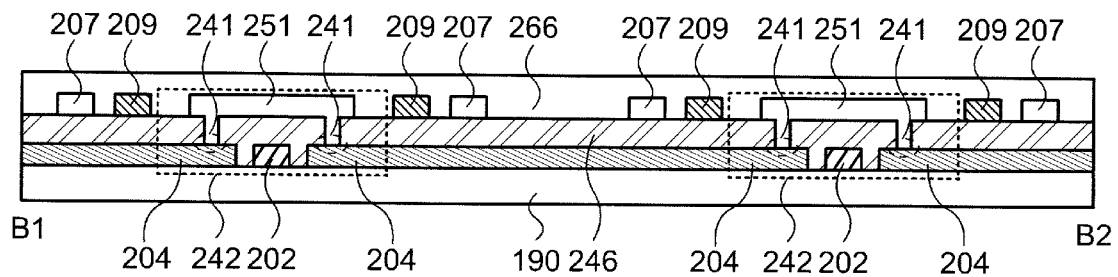
FIG. 10B is a schematic cross-sectional view of a touch sensor according to an embodiment of the present invention.

FIG. 9 is a schematic plan view showing an example of a touch sensor according to an embodiment of the present invention. FIG. 10A is a schematic cross-sectional view taken along line A1-A2 in FIG. 9. FIG. 10B is a schematic cross-sectional view taken along B1-B2 in FIG. 9. FIG. 9 shows an example in which, compared to FIG. 4, the first touch electrode 202 and the second touch electrode 204 each have a plurality of touch electrodes in a strip shape, and these plurality of touch electrodes in a strip shape intersect with each other. Structures other than this are similar to those of FIG. 4, thus, a description is omitted.

In a display device having a touch sensor such as this, since the size of the surface area on which the touch electrodes are arranged may be further reduced, a highly transmissive display device which easily detects and recognizes ghost touch may be provided.

Figure 11:
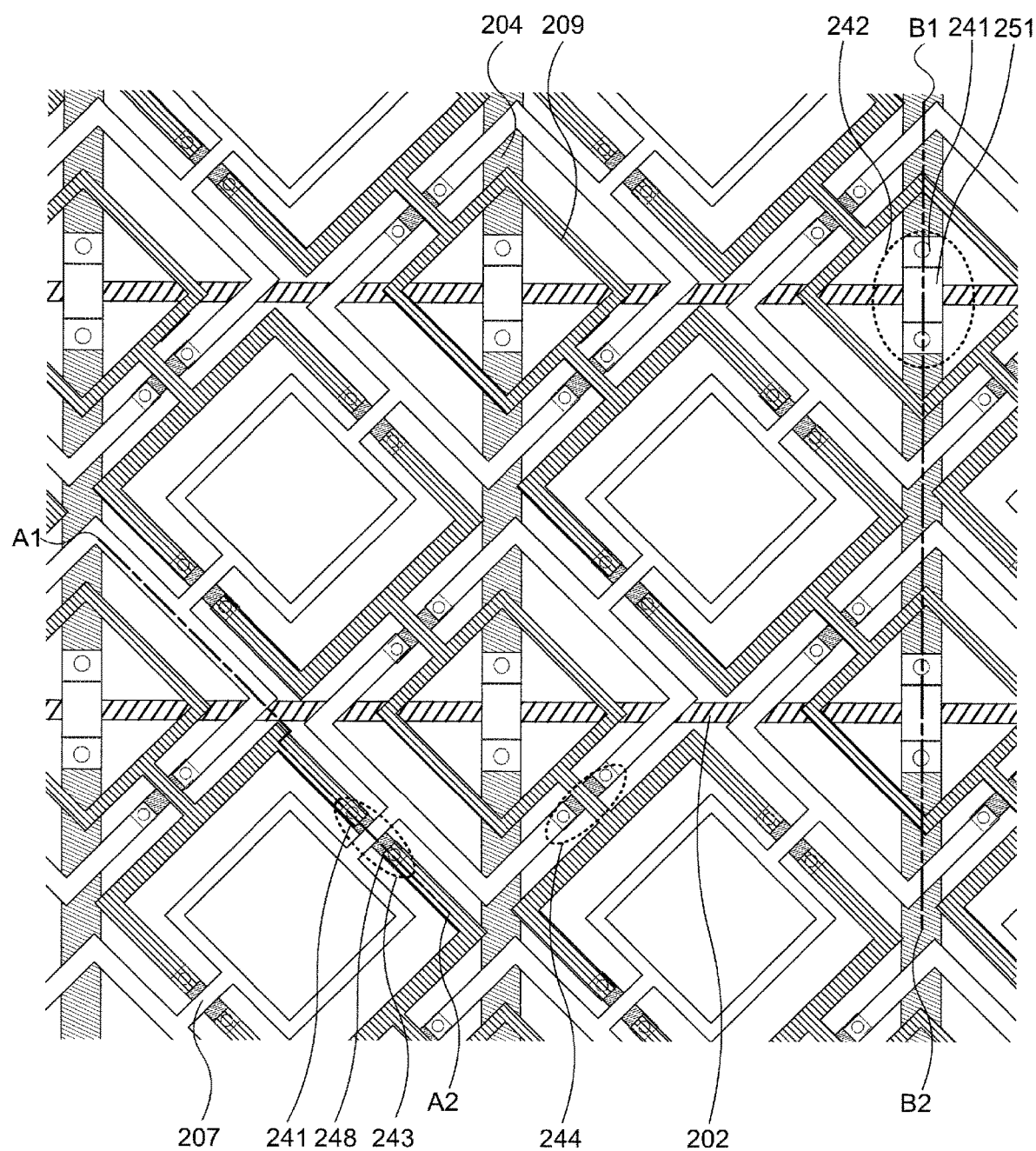
FIG. 11 is a schematic plan view of a touch sensor according to an embodiment of the present invention.
Figure 12A:
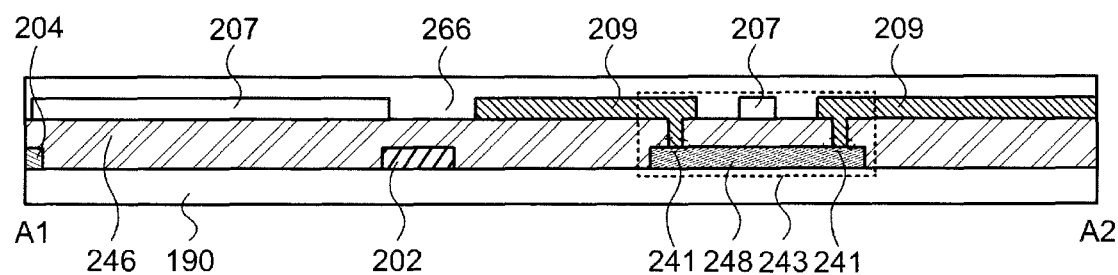
FIG. 12A is a schematic cross-sectional view of a touch sensor according to an embodiment of the present invention.
Figure 12B:
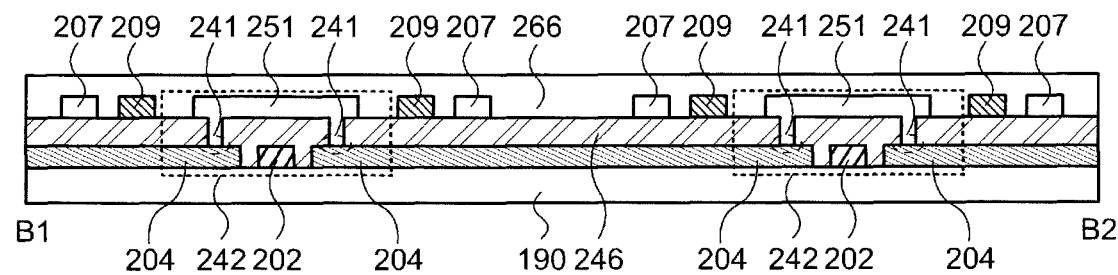
FIG. 12B is a schematic cross-sectional view of a touch sensor according to an embodiment of the present invention.

FIG. 11 is a schematic plan view showing an example of a touch sensor according to an embodiment of the present invention. FIG. 12A is a schematic cross-sectional view taken along line A1-A2 in FIG. 11. FIG. 12B is a schematic cross-sectional view taken along line B1-B2 in FIG. 11. FIG. 11 shows an example of a region of FIG. 9 in which linear shaped, circular shaped, and arc-like linear shaped patterns of the third touch electrode 207 and the fourth touch electrode 209 are electrically connected becomes a region in which linear shaped, rectangular shaped, and U-shaped patterns are electrically connected. Structures other than this are similar to those of FIG. 9, thus, a description is omitted.

Each electrode in a display device having a touch sensor such as this is formed having at least one or more shapes of a linear shape, U-shape, or rectangular shape, electrically connected to the first bridge wiring 248 or the second bridge wiring 251 via the contact hole 241. For this reason, it is not necessary to use round figures such as curves and rings, thus the time needed to plan the layout may be reduced. In addition, since the size of the surface area on which the touch electrodes are arranged may be further reduced, a highly transmissive display device which easily detects and recognizes ghost touch may be provided.

Further, in the cross-sectional views of the touch sensor shown in FIG. 8A, FIG. 8B, FIG. 10A, FIG. 10B, FIG. 12A and FIG. 12B, an example is shown in which the layer containing the first touch electrode 202, the second touch electrode 204, and the first bridge wiring 248 is below, and the layer containing the third touch electrode 207, the fourth touch electrode 209, and the second bridge wiring 251 is above with respect to the interlayer insulating film 246. This structure may also arrange the layer containing the first touch electrode 202, the second touch electrode 204, and the first bridge wiring 248 above, and the layer containing the third touch electrode 207, the fourth touch electrode 209, and the second bridge wiring 251 below with respect to the interlayer insulating film 246. Even if the layer containing the first touch electrode 202, the second touch electrode 204, and the first bridge wiring 248 and the layer containing the third touch electrode 207, the fourth electrode 209, and the second bridge wiring 251 are switched above and below, the accuracy of detection and recognition of ghost touch in the touch sensor according to an embodiment of the present invention may be improved.

This embodiment and other embodiments of the present invention may be freely combined.

Embodiment 3

In the present embodiment, detection and the like of ghost touch of the touch sensor according to an embodiment of the present invention will be described. Further, descriptions of structures similar to those of Embodiment 1 and Embodiment 2 will be omitted.

Figure 13:
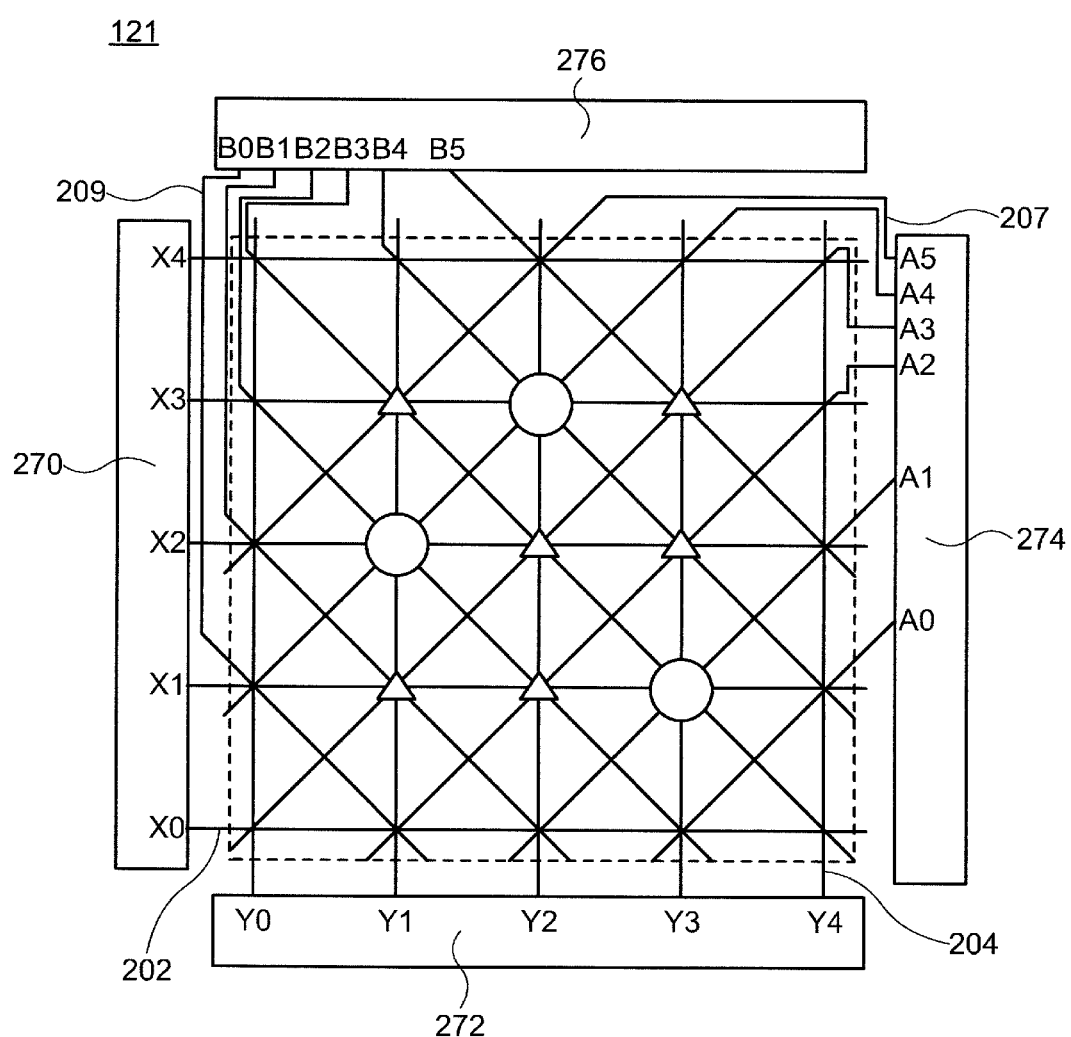
FIG. 13 is a schematic plan view describing detection of ghost touch of a touch sensor according to an embodiment of the present invention.

FIG. 13 is a schematic plan view describing the detection of ghost touch of a touch sensor according to an embodiment of the present invention. The touch sensor 200 is configured by a first touch electrode detection circuit 270, a second touch electrode detection circuit 272, a third touch electrode detection circuit 274, a fourth touch electrode detection circuit 276, first touch electrodes X0 to X4, second touch electrodes Y0 to Y4, third touch electrodes A0 to A5, and fourth touch electrodes B0 to B5.

An example in which a user touches three points (places) will be described. The circular symbol (○) shown in the drawings shows the places touched, and the triangular symbol (△) shows the places in which ghost touch appeared.

The coordinates of three touched places are (X1, Y3), (X2, Y1), and (X3, Y2). When a user touches the display device, since the capacitance value of the touch electrode of the touched place changes, either the capacitance value or the change in capacitance value may be detected by the first touch electrode detection circuit 270 or the second touch electrode detection circuit 272. The ghost touch places, for example, appear at coordinates (A2, B2), (A2, B4), (A3, B1), (A3, B3), (A3, B5), and (A5, B3). Each place is unique, and therefore may be detected by the third touch electrode detection circuit 274 and the fourth touch electrode detection circuit 276. Accordingly, the places of the display device touched by the user may be discerned from the places in which ghost touch is generated.

As a method for detecting touched places and ghost touch places, for example, a method may be used in which at least either the capacitance value or the change in capacitance value of each coordinate is monitored in sequence by the touch electrode detection circuits. However, the method for detecting touched places and ghost touch places is not limited to that shown in this example, and another method used in the technical field of the present invention may be used.

Each touch electrode detection circuit, for example, may have an operating amplifier (also referred to as an op-amp), an analog-digital converter (also referred to as an AD converter), a digital-analog converter (also referred to as a DA converter), an integration circuit, an operational circuit, and the like. These circuits, within an implementable scope, may be mounted on the substrate 104. In addition, a circuit formed above a substrate (such as a semiconductor substrate) different from the substrate 104 may be provided above the substrate 104 and the connector 214, and these circuits may be controlled so as to detect touched areas and the like.

By using a touch sensor such as the one above, the places touched by a user and the places in which ghost touch is generated are detected, and places touched by the user and ghost touch may be discerned. Accordingly, a touch sensor capable of reliably detecting places touched by a user and a display device having the same may be provided.

Further, the present embodiment may be freely combined with other embodiments of the present invention.

Embodiment 4

In the present embodiment, another example of a touch sensor according to an embodiment of the present invention will be described. Further, descriptions of structures similar to those of Embodiment 1 through Embodiment 3 will be omitted.

Figure 14:
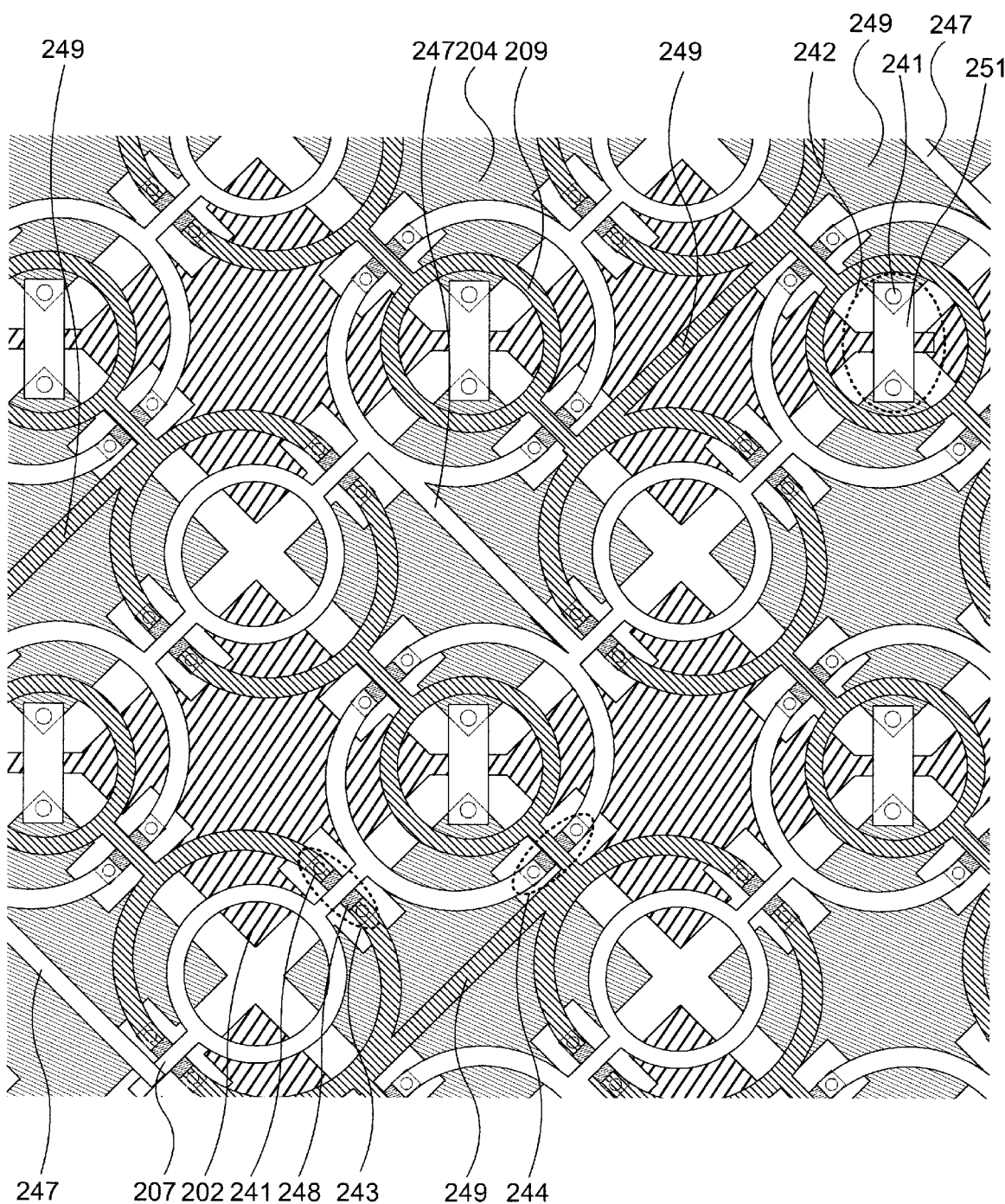
FIG. 14 is a schematic plan view of a touch sensor according to an embodiment of the present invention.

FIG. 14 is a schematic plan view showing an example of a touch sensor according to an embodiment of the present invention. The touch sensor shown in FIG. 14 has a structure which electrically connects adjacent third touch electrodes and electrically connects adjacent fourth touch electrodes. Structures other than this are similar to those of FIG. 4, thus, a description is omitted.

Adjacent touch electrodes are electrically connected by a first adjacent electrode connection wiring 247 or a second adjacent electrode connection wiring 249. Further, the first adjacent electrode connection wiring 247 and the second adjacent electrode connection wiring 249 may be in separate layers from the third touch electrode and the fourth touch electrode. The resistance value of each touch electrode may be reduced by electrically connecting adjacent touch electrodes. Thus, the accuracy of detection of touched places and ghost touch may be further improved.

In the present embodiment, an example is shown in which two adjacent touch electrodes are electrically connected, however, it is not limited to this example. Three or more adjacent touch electrodes may also be electrically connected to each other.

In addition, in the present embodiment, an example is shown in which two adjacent electrodes of both the third touch electrodes and the fourth touch electrodes are electrically connected, however, it is not limited to this example. For example, the number of electrically connected third touch electrodes and fourth touch electrodes may vary. Additionally, any of the touch electrodes may be configured so as to detect with one touch electrode without electrically connecting two or more electrodes, as is conventional. With a structure such as the one above, a touch sensor and a display device having a touch sensor may be provided in which touch electrodes requiring highly sensitive detection and having a low resistance, and touch electrodes set as normal and for which normal detection sensitivity is not a problem may be combined without altering the manufacturing process.

Further, this embodiment may be freely combined with other embodiments of the present invention.

Embodiment 5

In the present embodiment, a cross-sectional structure of a display device having a touch sensor according to an embodiment of the present invention will be described. Further, descriptions relating to structures similar to those of Embodiment 1 through Embodiment 4 will be omitted.

Figure 15:
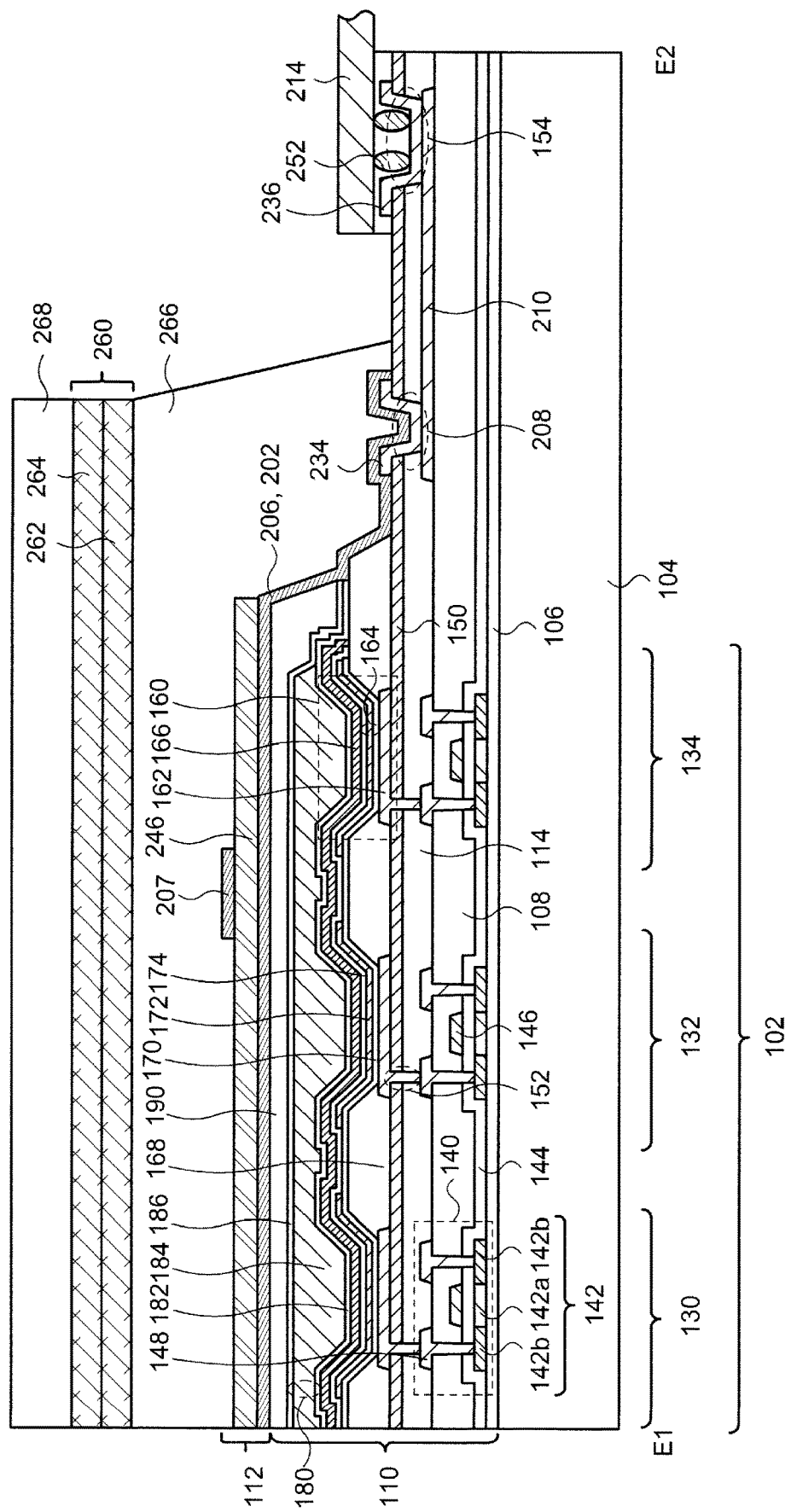
FIG. 15 is a schematic cross-sectional view of a pixel region of a display device having a touch sensor according to an embodiment of the present invention.

A schematic cross-sectional view of a display device having a touch sensor according to an embodiment of the present invention is shown in FIG. 15. FIG. 15 is a cross-section taken along line E1-E2 in FIG. 1A. It schematically shows a cross-section from the display region 102 to the first wiring 206, the first terminal wiring 210, and the first terminal 212.

The display device 100 has a first layer 110 and a second layer 112 above the substrate 104. When the substrate 104 is flexible, a base material may be formed above the substrate 104. In this case, the substrate 104 may be called a support substrate. As will be described later, the first layer 110 is provided with a transistor and a light emitting element for controlling the subpixel 130, the subpixel 132, and the subpixel 134, and contributes to displaying images. The first touch sensor 200 and the second touch sensor 201 are provided in the second layer 112 and contribute to touch detection.

<1. First Layer>

A transistor 140 is provided above the substrate 104 via a base film 106 which is an arbitrary structure. The transistor 140 includes a semiconductor film 142, a gate insulating film 144, a gate electrode 146, and a source and drain electrode 148. The gate electrode 146 overlaps the semiconductor film 142 via the gate insulating film 144. The region overlapping the gate electrode 146 is a channel region 142a of the semiconductor film 142. The semiconductor film 142 may have a source and drain region 142b sandwiching the channel region 142a. An interlayer film 108 is provided above the gate electrode 146. The source and drain electrode 148 may be electrically connected to the source and drain region 142b via an opening provided in the insulating film 144.

The first terminal wiring 210 is provided above the interlayer film 108. The first terminal wiring 210 may be in the same layer as the source and drain electrode 148.

Although not illustrated, the first terminal wiring 210 may be configured so as to be in the same layer as the gate electrode 146.

In FIG. 15, the transistor 140 is illustrated as a top gate type transistor, however, it is not limited to this structure. For example, the transistor 140 may be a bottom gate type transistor, a multi-gate type transistor having a plurality of gate electrodes 146, or a dual-gate type transistor having a structure with two gate electrodes 146 sandwiching the semiconductor film 142 above and below. Additionally, FIG. 15 shows an example in which one transistor 140 is provided in each subpixel 130, subpixel 132, and subpixel 134. However, the subpixel 130, the subpixel 132, and the subpixel 134 may further have semiconductor elements such as a plurality of transistors and capacitative elements.

A planarization film 114 is provided above the transistor 140. The planarization film 114 has a function for absorbing unevenness originating in the transistor 140 and other semiconductor elements and providing a planar surface.

An inorganic insulating film 150 may be formed above the planarization film 114. The inorganic insulating film 150 has a function for protecting semiconductor elements such as the transistor 140. Additionally, capacitance may be formed by sandwiching the inorganic insulating film 150 with a first electrode 162 of the later described light emitting element 160 and an electrode formed below the inorganic insulating film 150 (not illustrated).

A plurality of openings are provided in the planarization film 114 and the inorganic insulating film 150. Among these plurality of openings is a contact hole 152. The contact hole 152 is used for electrically connecting the first electrode 162 of the later described light emitting element 160 and the source and drain electrode 148. Among the plurality of openings is the contact hole 208. The contact hole 208 is used for electrically connecting the first wiring 206 and the first terminal wiring 210. Another one of the openings is an opening 154. The opening 154 is provided so as to expose a portion of the first terminal wiring 210. The first terminal wiring 210 exposed at the opening 154 is, for example, connected to the connector 214 by an anisotropic conductive film 252.

A light emitting element 160 is formed above the planarization film 114 and the inorganic insulating film 150. The light emitting element 160 is formed by a first electrode 162, a function layer 164, and a second electrode 166. The first electrode 162 is a pixel electrode, and the second electrode 166 is a counter electrode. More specifically, the first electrode 162 covers the contact hole 152 and is electrically connected to the source and drain electrode 148. In this way, an electrical current is supplied to the light emitting element 160 from the first electrode 162 via the transistor 140. A partition 168 is provided so as to cover the edge portion of the first electrode 162. The function layer 164 and the second electrode 166 above this may be prevented from disconnecting by covering the edge portion of the first electrode 162 with the partition 168. The function layer 164 is provided so as to cover the first electrode 162 and the partition 168. The second electrode 166 is formed above the function layer 164. A carrier is injected from the first electrode 162 and the second electrode 166 to the function layer 164, and recombination of the carrier occurs in the function layer 164. In this way, molecules with light emitting properties inside the function layer 164 enter an excited state, and a process is undergone alleviating the molecules to a ground state and emitting light. Accordingly, the region in which the first electrode 162 and the function layer 164 come in contact becomes a light emitting region in the subpixel 130, the subpixel 132, and the subpixel 134.

The structure of the function layer 164 may be selected as appropriate. The function layer 164, for example, may have a structure in which a carrier injection layer, a carrier transport layer, a light emitting layer, a carrier blocking layer, an exciton blocking layer, and the like are combined. In FIG. 15, an example is shown in which the function layer 164 has a layer 170, a layer 172, and a layer 174. In this case, for example, the layer 170 may be a carrier (hole) injection and transportation layer, the layer 172 may be a light emitting layer, and the layer 174 may be a carrier (electron) injection and transportation layer. The layer 172 which is a light emitting layer is configured so as to include different materials in the subpixel 130, the subpixel 132, and the subpixel 134. In this case, the layer 170 and the layer 174 may be formed across the subpixel 130, the subpixel 132, the subpixel 134, and the partition 168 so as to be shared by the subpixel 130, the subpixel 132, and the subpixel 134. By selecting the materials used in the layer 172 as appropriate, the subpixel 130, the subpixel 132, and the subpixel 134 may be colorized differently. Alternatively, the structure of the layer 174 may be the same between the subpixel 130, the subpixel 132, and the subpixel 134. In this case, the layer 174 may also be formed across the subpixel 130, the subpixel 132, the subpixel 134 and above the partition 168 so as to be shared by the subpixel 130, the subpixel 132, and the subpixel 134. In a structure such as this, since color emitted from the layer 172 of the subpixel 130, the subpixel 132, and the subpixel 134 is the same, for example, the layer 172 may have a white light emitting structure, and color filters may be used to produce a variety of colors (for example red, green, and blue) from the subpixel 130, the subpixel 132, and the subpixel 134.

The display device 100 may further have a connection electrode 234 and a connection electrode 236 adjacent to the first terminal wiring 210 and covering the contact hole 208 and the opening 154. The connection electrode 234 and the connection electrode 236 may be formed in the same layer as the first electrode 162. By forming the connection electrode 234 and the connection electrode 236, it becomes possible to reduce damage to the first terminal wiring 210 in the manufacturing process of the display device 100. By reducing damage to the first terminal wiring 210 in the manufacturing process of the display device 100, the conductive layer connected to the connection electrode 234 and the connection electrode 236, the connection electrode 234 and the connection electrode 236 may be electrically connected with a low contact resistance.

A sealing layer 180 may be provided above the light emitting element 160. The sealing layer 180, for example, is a passivation film. The sealing layer 180 has a function preventing impurities (moisture, oxygen, and the like) from penetrating the light emitting element 160 and the transistor 140 from the outside. As is shown in FIG. 15, the sealing layer 180 may include a layer 182, a layer 184, and a layer 186. The layer 182, for example, is a first inorganic layer. Additionally, the layer 186, for example, is a second inorganic layer. The first inorganic layer and second inorganic layer include inorganic compounds. The layer 184 between the first inorganic layer 182 and the second inorganic layer 186 may use a layer (organic layer) 184 including organic compounds. The organic layer 184 may be formed so as to absorb unevenness originating in the light emitting element 160 and the partition 168 and provide a planar surface. Thus, the thickness of the organic layer 184 may be relatively thick. Therefore, the distance between the first touch electrode 202 of the first touch sensor 200 and the later described other electrode (second electrode 166) of the light emitting element 160 may be greater. As a result, parasitic capacitance occurring between the first touch sensor 200 and the second electrode 166 may be drastically reduced.

Further, the first inorganic layer 182 and the second inorganic film 186 are preferably formed so as to stay within the display region 102. In other words, the first inorganic layer 182 and the second inorganic layer 186 are preferably provided so as to not overlap the contact hole 208 and the opening 154. In this way, the first terminal wiring 210, the connector 214, and the first wiring 206 may be electrically connected with low contact resistance. Further, in the periphery of the display region 102, the first inorganic layer 182, and the second inorganic layer 186 are preferably in direct contact. In this way, the organic layer 184 may be sealed by the first inorganic layer 182 and the second inorganic layer 186. Thus, the permeation of impurities from outside the organic layer 184 and the spread of impurities inside the display region 102 may be more effectively prevented.

The display device 100 further has an organic insulating film 190 above the sealing layer 180. The organic insulating film 190 may be provided so as to be in contact with the second inorganic layer 186 of the sealing layer 180.

The first layer 110 is configured by the various elements and films described above.

<2. Second Layer>

The second layer 112 includes the first touch electrode 202, the second touch electrode 204, the third touch electrode 207, the fourth touch electrode 209, the interlayer insulating film 246, the first wiring 206, and the second wiring 216.

The first touch electrode 202 and the second touch electrode 204 are formed above the organic insulating film 190 and may be in the same layer as the first wiring 206. For example, the first wiring 206 extends to the contact hole 208 via the display region 102 (see FIG. 1A). The first wiring 206 is further electrically connected to the first terminal wiring 210 in the same layer as the source and drain electrode 148 (or gate electrode 146) of the transistor 140 via the contact hole 208 and the connection electrode 234. In this way, the first touch electrode 202 is electrically connected to the first terminal wiring 210. The fourth touch electrode 209 is electrically connected to the first wiring 206 via the first bridge wiring 248 and the contact hole 241 formed in the same layer as the first touch electrode 202 and the first wiring 206. The fourth touch electrode 209 is electrically connected to the first terminal wiring 210.

The interlayer insulation film 246 is provided so as to cover the plurality of first touch electrodes 202 and the plurality of second touch electrodes 204.

The third touch electrode 207 and the fourth touch electrode 209 are in the same layer as the second wiring 216.

For example, the third touch electrode 207 is electrically connected to the second wiring 216 extending from outside of the display region 102. Additionally, the second touch electrode 204 is electrically connected to the second wiring 216 formed in the same layer as the third touch electrode 207 via the first bridge wiring 248 and the contact hole 241. The second wiring 216 extends outside of the display region 102 and is electrically connected to the second terminal wiring 220 in the contact hole 218. The second terminal wiring 220 is exposed near the edge of the display device 100 and forms the second terminal 222. The second terminal 222 is connected to the connector 214. Signals for touch sensors are supplied to the second touch electrode 204 and the third touch electrode 207 from an exterior circuit via the second terminal 222.

The interlayer insulating film 266 is provided so as to cover the plurality of third touch electrodes 207 and the plurality of fourth touch electrodes 209.

<3. Other Structures>

The display device 100 may further have a circular polarization plate 260 overlapping the display region 102 as an arbitrary structure. The circular polarization plate 260 may have a stacked structure of a ¼λ plate 262 and a linear polarization plate 264 above. Light incident from outside of the display device 100 becomes clockwise circular polarized light when passing through the ¼λ plate 262 after permeating the linear polarization plate 264 and becoming linear polarized light. Clockwise circular polarized light becomes counterclockwise circular polarized light by reflecting in the first electrode 162, the first touch electrode 202, or the second touch electrode 204. Counterclockwise circular polarized light becomes linear polarized light by passing through the ¼λ plate 262. The polarization plane of linear polarized light at this time intersects with the linear polarized light before reflection. Therefore, it cannot pass through the linear polarization plate 264. As a result, reflection of external light may be controlled by arranging the circular polarization plate 260, and a high contrast image may be provided.

The insulating film 266 may be provided as a protection film above the plurality of third touch electrodes 207 and the plurality of fourth touch electrodes 209. Here, the refraction rate of the insulating film 266 is preferably substantially equal to the refraction rate of the interlayer insulating film 246. For this reason, the same material may be used as the insulating film 266 and the interlayer insulating film 246. When materials with a difference in refraction rate are used in the insulating film 266 and the interlayer insulating film 246, the film thickness of the insulating film 266 and the interlayer insulating film 246 may be adjusted, and the optical path difference described above may be adjusted so as to be kept low.

Further, the insulating film 266 has a function for adhering the circular polarization plate 260 and the second layer 112 while physically protecting the display device 100.

A cover film 268 may be provided in the display device 100 as an arbitrary structure. The cover film 268 has a function for physically protecting the circular polarization plate 260. By providing a circular polarization plate 260, the display device according to an embodiment of the present invention may provide a high-contrast, high-quality image, without emitting exterior light reflected by the first touch electrode 202, the second touch electrode 204, the third touch electrode 207, and the fourth touch electrode 209 outside of the display device 100.

Embodiment 6

In the present embodiment, a manufacturing method of a display device having a touch sensor according to an embodiment of the present invention will be described. Further, descriptions relating to structures similar to those of Embodiment 1 through Embodiment 5 will be omitted.

The manufacturing method of a display device having a touch sensor according to an embodiment of the present invention will be described using FIG. 15 and FIG. 16 through FIG. 21. FIG. 16 through FIG. 21 correspond to the cross-section shown in FIG. 15.

<1. First Layer>

As is shown in FIG. 16A, first, the base film 106 is formed above the substrate 104. The substrate 104 has a function for supporting semiconductor elements and the touch sensor 200 included in the display region 102. The substrate 104 may include glass, quartz, plastic, metal, or ceramic.

When the display device 100 is flexible, a base material may be formed above the substrate 104. In this case, the substrate 104 may also be referred to as a support substrate. The base material may include polymer materials such as polyimide, polyamide, polyester, or polycarbonate. The base material may be formed by applying a wet-type film formation method such as a printing method and an inkjet method, a spin coat method, or a dip coating method, or a lamination method. In this case, after manufacturing the display device 100, a flexible display device 100 may be obtained by detaching the base material from the surface boundary of the substrate 104 and the base material. On the other hand, the display device 100 may be manufactured such that the substrate 104 itself is made of flexible materials.

The base film 106 is a film having a function for preventing the spread of impurities such as alkali metals to the transistor 140 from the substrate 104 (or base material). The base film 106 may include a silicon nitride, a silicon oxide, a silicon oxynitride, or a silicon nitride oxide. The base film 106 may be formed using a chemical vapor deposition method (CVD) or a sputtering method. The base film 106 may have a single layer or stacked layer structure. When the density of impurities in the substrate 104 (or base material) is low, the base film 106 is not provided, or is formed so as to only cover a portion of the substrate 104.

Next, the semiconductor film 142 is formed (FIG. 16A). The semiconductor film 142 may include silicon, for example. Alternatively, the semiconductor film 142 may include an oxide semiconductor. The oxide semiconductor may be indium gallium oxide (IGO), or indium gallium zinc oxide (IGZO). Further, the crystalline nature of the semiconductor film 142 may be monocrystalline, polycrystalline, microcrystalline, or amorphous.

When the semiconductor film 142 includes silicon, the semiconductor film 142 may be formed by a CVD method using silane gas and the like as raw materials. Crystallization may be performed by applying a heat treatment to amorphous silicon or by radiating light such as a laser. The semiconductor film 142 may be formed using a sputtering method or the like when an oxide semiconductor is included.

Next, the gate insulating film 144 is formed so as to cover the semiconductor film 142 (FIG. 16A). The gate insulating film 144 may have either a single layer structure or a stacked layer structure. Additionally, the gate insulating film 144 may be formed using the same method as the base film 106.

Then, the gate electrode 146 is formed above the gate insulating film 144 using a sputtering method or CVD method (FIG. 16B). The gate electrode 146 may be formed using metals such as titanium, aluminum, copper, molybdenum, tungsten, tantalum, or an alloy thereof. In addition, the gate electrode 146 may be formed so as to have a single layer or stacked layer structure. For example, the gate electrode 146 may have a structure in which metals having a relatively high melting point such as titanium, tungsten or molybdenum sandwich highly conductive metals such as aluminum or copper.

Next, the interlayer film 108 is formed above the gate electrode 146 (FIG. 17A). The interlayer film 108 may have either a single layer structure or a stacked layer structure. The interlayer film 108 may be formed with the same method as the base film 106. When the interlayer film 108 has a stacked layer structure, for example, a layer including an inorganic compound may be stacked after a layer including an organic compound is formed.

Next, etching is performed on the interlayer film 108 and the gate insulating film 144, and an opening is formed reaching the semiconductor film 142. The opening may be formed by performing plasma etching in a gas including a hydrocarbon group containing fluorine, for example.

Next, a metal film is formed so as to cover the opening, and the source and drain electrode 148 is formed. In the present embodiment, the first terminal wiring 210 is formed at the same time as the formation of the source and drain electrode 148 (FIG. 17B). Accordingly, the source and drain electrode 148 and the first terminal wiring 210 may be in the same layer. The metal film may have a structure similar to that of the gate electrode 146, and may be formed using the same method as the formation of the gate electrode 146.

Next, the planarization film 114 is formed so as to cover the source and drain electrode 148 and the first terminal wiring 210 (FIG. 18A). The planarization film 114 has a function for absorbing unevenness and slopes originating in the transistor 140 and first terminal wiring 210 and providing a planar surface. The planarization film 114 may be formed by an organic insulator. The organic insulator may be a polymer material such as epoxy resin, acrylic resin, polyimide, polyamide, polyester, polycarbonate, or polysiloxane. The organic insulator may be formed by the previously described wet-type film formation methods.

Then, the inorganic insulating film 150 is formed above the planarization film 114 (FIG. 18A). As previously described, the inorganic insulating film 150 not only functions as a protection film for the transistor 140, but also forms capacitance (not illustrated) along with the first electrode 162 of the subsequently formed light emitting element 160. Accordingly, the inorganic insulating film 150 preferably uses a material with a relatively high dielectric constant. The inorganic insulating film 150, for example, may use silicon nitride, silicon oxynitride, or silicon nitride oxide. For example, the inorganic insulating film 150 may be formed using a CVD method or a sputtering method.

Next, as is shown in FIG. 18B, the opening 154, the contact hole 152, and the contact hole 208 are formed. After, the first electrode 162, the connection electrode 234, and the connection electrode 236 are formed so as to cover the opening 154, the contact hole 152, and the contact hole 208 (FIG. 19A).

Here, the region in which the connection electrode 236 is formed, for example, is the opening 154. The opening 154 becomes the region in which the connector 214, such as an FPC, is later connected via an anisotropic conductive film or the like. Thus, the opening 154 may have a larger surface area than the region in which the connection electrode 234 is formed. Further, the region in which the connection electrode 234 is formed, for example, is the contact hole 208. The size of the opening 154 varies based on the terminal pitch of the connector 214, and, for example, may have a width of 10 µm to 50 µm and a length of 1 mm to 2 mm. On the other hand, the size of the contact hole 208, for example, is several µm×several µm to several tens of µm×several tens of µm. The opening 154 may only be made so small due to the mounting process of the connector 214. The contact hole 208 may be as small as possible so long as the conductive layers connected here (in this case, the first terminal wiring 210, the connection electrode 234, and the first wiring 206) are connected with a sufficiently low contact resistance.

When light from the light emitting element 160 is ejected from the second electrode 166, the first electrode 162 is configured so as to reflect visible light. In this case, the first electrode uses highly reflective metals such as silver, aluminum, or an alloy thereof. Alternatively, a translucent conductive oxide film is formed above a film including these metals and alloys. The conductive oxide may be ITO or IZO. When light from the light emitting element 160 is ejected from the first electrode 162, the first electrode 162 may be formed using ITO or IZO.

In the present embodiment, the first electrode 162, the connection electrode 234, and the connection electrode 236 are formed above the inorganic insulating film 150. Accordingly, the previously described metal film is formed so as to cover, for example, the opening 154, the contact hole 152, and the contact hole 208. Then, a film including a conductive oxide through which visible light passes is formed. Further, an etching process is performed, forming the first electrode 162, the connection electrode 234, and the connection electrode 236. Alternatively, a conductive oxide film, a metal film described above, and another conductive oxide film may be stacked in this order so as to cover the opening 154, the contact hole 152, and the contact hole 208, then an etching process may be performed. Alternatively, a conductive oxide may be formed so as to cover the opening 154, the contact hole 152, and the contact hole 208, then three films of a conductive oxide film, a previously described metal film, and another conductive oxide film may form a stack of films so as to selectively cover the contact hole 152.

Next, the partition 168 is formed so as to cover the edge portion of the first electrode 162 (FIG. 19B). With this partition 168, unevenness originating in the first electrode 162 is absorbed, and the first electrodes 162 of adjacent subpixels may be electrically insulated from each other. The partition 168 may be formed with a wet-type film formation method using materials that can be used in the planarization film 114.

Next, the function layer 164 of the light emitting element 160 and the second electrode 166 are formed so as to cover the first electrode 162 and the partition 168 (FIG. 19B). The function layer 164 mainly includes organic compounds, and is formed using a wet-type film formation method such as an inkjet method or a spin coat method, or a dry-type film formation method such as vapor deposition.

When light from the light emitting element 160 is ejected from the first electrode 162, the second electrode 166 may use metals such as aluminum, magnesium, silver, or an alloy thereof. When light from the light emitting element 160 is ejected from the second electrode 166, the second electrode 166 may use a translucent conductive oxide such as ITO. Alternatively, the previously described metals may be formed with a thickness through which visible light may pass. In this case, a translucent conductive oxide may be stacked.

Next, the sealing layer 180 is formed. As is shown in FIG. 20A, the first inorganic layer 182 is formed so as to cover the light emitting element 160, the connection electrode 234, and the connection electrode 236. The first inorganic layer 182 may include inorganic materials such as silicon nitride, silicon oxide, silicon oxynitride, silicon nitride oxide, and the like, and may be formed with the same method as the base film 106.

Next, the organic layer 184 is formed (FIG. 20A). The organic layer 184 may contain an organic resin including acrylic resin, polysiloxane, polyimide, polyester, or the like. The organic layer 184 may have a thickness that provides a planar surface. The organic layer 184 is preferably selectively formed in the display region 102. That is to say, the organic layer 184 is preferably formed so as not to overlap the connection electrode 234 and the connection electrode 236. The organic layer 184 may be formed by a wet-type film formation method such as an inkjet method. Alternatively, oligomers which become raw materials of the above-mentioned polymer materials are nebulized or become gaseous under reduced pressure and are sprayed onto the first inorganic layer. Then, the organic layer 184 is formed by polymerizing the oligomers.

After, the second inorganic layer 186 is formed (FIG. 20A). The second inorganic layer 186 has a structure similar to that of the first inorganic layer 182 and may be formed in a similar method. The second inorganic layer 186 may also be formed not only above the organic layer 184, but so as to cover the connection electrode 234 and the connection electrode 236. Thus, the organic layer 184 may be sealed by the first inorganic layer 182 and the second inorganic layer 186.

Next, the organic insulating film 190 is formed (FIG. 20B). The organic insulating film 190 may include the same materials as the organic layer 184 of the sealing layer 180, and be formed by the same method. The organic insulating film 190, as is shown in FIG. 20B, preferably selectively covers the region in which the first inorganic layer 182 and the second inorganic layer 186 are in contact with each other. Further, the organic insulating film 190 is preferably formed so as not to overlap the connection electrode 234 and the connection electrode 236. Then, using the organic insulating film 190 as a mask, the first inorganic layer 182 and the second inorganic layer 186 exposed from the organic insulating film 190 are removed by etching (FIG. 21A). Thus, the connection electrode 234 is exposed at the contact hole 208 arranged outside of the display region 102. In addition, the connection electrode 236 is exposed at the opening 154 arranged outside of the display region 102. At that time, a portion of the inorganic insulating film 150 is etched, and the thickness becomes thinner.

The first layer 110 is formed by the above process.

<2. Second Layer>

After this, the second layer 112 is formed including the first touch sensor 200 and the second touch sensor 201. Specifically, the first touch electrode 202 is formed above the organic insulating film 190 (FIG. 21B). At this time, the second touch electrode 204 is also formed. The first touch electrode 202 and second touch electrode 204 may include a translucent conductive oxide as a primary element. This conductive oxide may be ITO or IZO.

The first wiring 206 is formed at the same time as the formation of the first touch electrode 202 and the second touch electrode 204. The first wiring 206 is formed so as to cover the contact hole 208. Thus, the first touch electrode 202 and the first terminal wiring 210 are electrically connected (FIG. 21B).

Next, the interlayer insulating film 246 is formed above the first touch electrode 202 and the second touch electrode 204 (FIG. 21B). The interlayer insulating film 246 may be formed with the same materials and the same method as the organic layer 184.

As another example of a method for forming the interlayer insulating film 246, a sheet-like interlayer insulating film 246 is formed beforehand, and is later adhered so as to cover the plurality of first touch electrodes 202 and the plurality of second touch electrodes 204.

After this, the third touch electrode 207 and the fourth touch electrode 209 are formed above the interlayer insulating film 246 (FIG. 21B).

The second layer 112 is formed by the above process.

<3. Other Layers>

Then, the insulating film 266, the circular polarization plate 260, and the cover film 268 are formed. Next, the connector 214 and the anisotropic conductive film 252 are connected via the opening 154. Thus, the display device shown in FIG. 15 is formed. The insulating film 266 may include polymer materials such as polyester, epoxy resin, or acrylic resin, and be formed by a printing method or lamination method. The cover film 268 may also include the same polymer materials as the insulation film 266, and in addition to the polymer materials described above, may use polymer materials such as polyolefin or polyimide.

Although not illustrated, when the display device 100 is flexible, for example, after the connector 214 is formed, light such as a laser is radiated from the substrate 104 side, the adhesiveness between the substrate 104 and the base material is reduced, then, the substrate 104 and the base material may be separated using physical force. Additionally, a process in which light such as a laser is radiated from the substrate 104 and the substrate 104 and the base material are separated may take place after the circular polarization plate 260 is formed, or after the insulating film 266 is formed.

Figure 22:
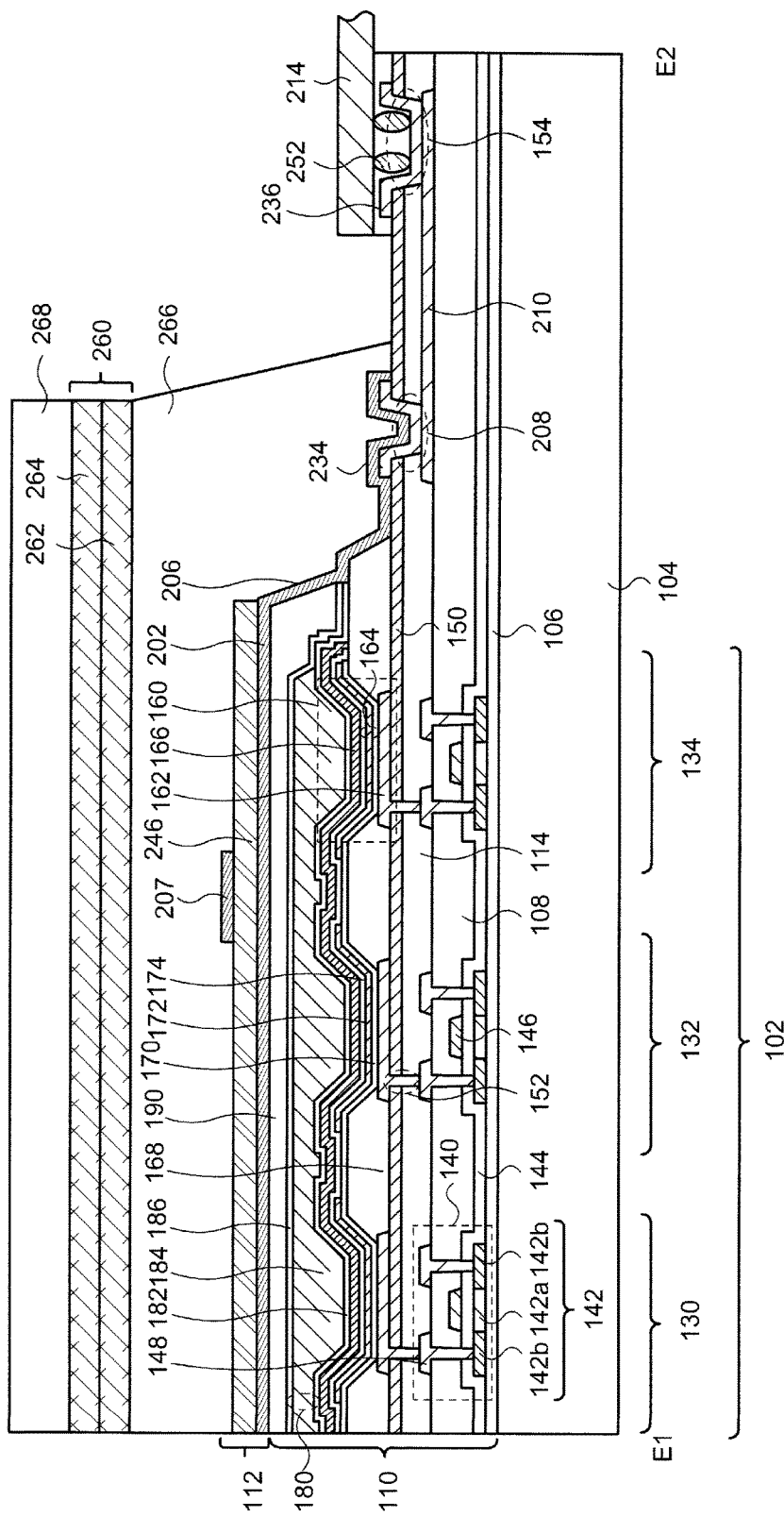
FIG. 22 is a schematic cross-sectional view of a pixel region of a display device having a touch sensor according to an embodiment of the present invention.

FIG. 22 shows a cross-sectional structure when the layer containing the plurality of first touch electrodes 202 and the plurality of second touch electrodes 204 of the first touch sensor 200 and the layer containing the plurality of third touch electrodes 207 and the plurality of fourth touch electrodes 209 of the second touch sensor 201 are switched above and below with respect to the interlayer insulating film 246.

As described in the present embodiment, the first touch sensor 200 is configured of a plurality of first touch electrodes 202 and a plurality of second touch electrodes 204. Additionally, the second touch sensor 201 is configured of a plurality of third touch electrodes 207 and a plurality of fourth touch electrodes 209. A display device having a touch sensor manufactured as above may detect places touched by the user and places in which ghost touch is generated, and discern places touched by the user and places in which ghost touch is generated. Thus, a touch sensor and a display device having a touch sensor which can reliably detect places touched by a user are provided.

Each embodiment described above as embodiments of the present invention may be combined and implemented, so long as they do not contradict each other. Additionally, based on the display device of each embodiment, any appropriate addition, removal, or alteration of structural elements, or any addition, omission, or alteration of steps made by a person skilled in the art are included in the scope of the present invention, so long as they support the gist of the present invention.

In the present specification, a display device is mainly exemplified as a disclosure example, however, other so-called front panel type display devices such as self-luminous type display devices, liquid crystal display devices, or digital paper type display devices having electrophoretic elements may be applicable. Additionally, the present specification is not particularly limited, and may be applicable to small and medium type to large type devices.

Even if the function effects are different from the function effects from the implementation of each of the embodiments described above, it is understood that anything made clear from the contents of the present specification, or anything easily predicted by a person skilled in the art, naturally comes from the present invention.

What is claimed is:

1. A touch sensor comprising:
a first touch electrode extending in a first direction;
a second touch electrode extending in a second direction intersecting the first direction;
a third touch electrode extending in a third direction intersecting between the first direction and the second direction;
a fourth touch electrode extending in a fourth direction intersecting the third direction, and
a first insulating film in between the first touch electrode and the third touch electrode, wherein
the first touch electrode has a plurality of first polygonal regions adjacent to each other, and the second touch electrode has a plurality of second polygonal regions adjacent to each other, and
the third touch electrode includes a first wire shaped portion overlapping one of the plurality of first polygonal regions and the plurality of second polygonal regions, and the fourth touch electrode includes a second wire shaped portion overlapping one of the plurality of first polygonal regions and the plurality of second polygonal regions.

2. The touch sensor according to claim 1, wherein the first wire shaped portion or the second wire shaped portion has an arc-like shape.

3. The touch sensor according to claim 2, further comprising:
a first bridge wiring; and
a second bridge wiring, wherein
the third touch electrode is in a second insulating film,
the first bridge wiring is in the second insulating film,
the first bridge wiring has a first region intersecting the first touch electrode in a plan view,
the second touch electrode is in contact with the first bridge wiring,
the second bridge wiring is in the first insulating film,
the fourth touch electrode is in contact with the second bridge wiring, and
the second bridge wiring has a second region intersecting the third touch electrode in a plan view.

4. The touch sensor according to claim 3, wherein each side of the plurality of first polygonal regions and second polygonal regions includes a notch portion, and the second bridge wiring is arranged between notch portions of adjacent two of the plurality of first polygonal regions and the plurality of second polygonal regions.

5. The touch sensor according to claim 3, wherein the first bridge wiring is surrounded by a wiring configuring the third touch electrode or a wiring configuring the fourth touch electrode in the plan view.

6. The touch sensor according to claim 1, wherein the first wire shaped portion or the second wire shaped portion has a U-shape.

7. The touch sensor according to claim 1, wherein the first touch electrode and the second touch electrode are in a first insulating film, and the first insulating film is between the first touch electrode and the third touch electrode.

8. The touch sensor according to claim 1, wherein the third electrode has a closed wire shaped portion surrounded by the first wire shaped portion or the second wire shaped portion in the plan view.

9. A display device comprising:
a display region arranging a plurality of pixels, and
a touch sensor arranged overlapping the display region, wherein the touch sensor includes a first touch electrode extending in a first direction;

a second touch electrode extending in a second direction intersecting the first direction;

a third touch electrode extending in a third direction intersecting between the first direction and the second direction;

a fourth touch electrode extending in a fourth direction intersecting the third direction, and a first insulating film is between the first touch electrode and the third touch electrode, wherein the first touch electrode is closer to the plurality of pixels than the third touch electrode, the first touch electrode has a plurality of first regions having polygonal outer shape, adjacent to each other, and the second touch electrode has a plurality of second regions having polygonal outer shape, adjacent to each other, and the third touch electrode include a wire shaped portion overlapping one of the plurality of first regions and the plurality of second regions, and the fourth touch electrode has a second wire shaped portion overlapping one of the plurality of first regions and the plurality of second regions.

10. The touch sensor according to claim 9, wherein the first wire shaped portion or the second wire shaped portion has an arc-like shape.

11. The touch sensor according to claim 10, further comprising:

a first bridge wiring; and a second bridge wiring, wherein the third touch electrode is in a second insulating film, the first bridge wiring is in the second insulating film, the first bridge wiring has a first region intersecting the first touch electrode in a plan view, the second touch electrode is in contact with the first bridge wiring, the second bridge wiring is in the first insulating film, the fourth touch electrode is in contact with the second bridge wiring, and the second bridge wiring has a second region intersecting the third touch electrode in a plan view.

12. The touch sensor according to claim 11, wherein each outer shape of the plurality of polygonal regions is rectangular with notch portions, and the second bridge wiring is arranged between opposite notch portions of adjacent polygonal regions.

13. The touch sensor according to claim 11, wherein the first bridge wiring is surrounded by a wiring configuring the third touch electrode or a wiring configuring the fourth touch electrode.

14. The touch sensor according to claim 9, wherein the first wire shaped portion or the second wire shaped portion has a U-shape.

15. The touch sensor according to claim 9, wherein the first touch electrode and the second touch electrode are in a first insulating film, and the first insulating film is between the first touch electrode and the third touch electrode.

16. The touch sensor according to claim 9, wherein the third electrode and the fourth electrode have a closed wire shaped portion surrounded by the first wire shaped portion or the second wire shaped portion in the plan view.

* * * * *